(12) United States Patent
Papandriopoulos et al.

(10) Patent No.: US 7,813,293 B2
(45) Date of Patent: Oct. 12, 2010

(54) METHOD FOR DISTRIBUTED SPECTRUM MANAGEMENT OF DIGITAL COMMUNICATIONS SYSTEMS

(76) Inventors: John Papandriopoulos, 205-211 Grattan Street, Parkville (AU) 3052; Jamie Scott Evans, 205-211 Grattan Street, Parkville (AU) 3052

( * ) Notice: Subject to any disclaimer, the term of this patent is extended or adjusted under 35 U.S.C. 154(b) by 936 days.

(21) Appl. No.: 11/433,025

(22) Filed: May 12, 2006

(65) Prior Publication Data
US 2007/0274404 A1  Nov. 29, 2007

(51) Int. Cl.
H04L 12/26 (2006.01)
(52) U.S. Cl. .................. 370/252; 370/201; 370/468; 703/18
(58) Field of Classification Search .......... 370/201, 370/252, 253, 468; 375/252, 254, 130, 240–241; 703/18–22, 2
See application file for complete search history.

(56) References Cited

U.S. PATENT DOCUMENTS

| | | | |
|---|---|---|---|
| 6,847,675 B2* | 1/2005 | Fullerton et al. | 375/130 |
| 6,885,746 B2* | 4/2005 | Hausman et al. | 379/417 |
| 7,158,563 B2* | 1/2007 | Ginis et al. | 375/224 |
| 7,274,734 B2* | 9/2007 | Tsatsanis | 375/222 |
| 7,295,608 B2* | 11/2007 | Reynolds et al. | 375/240.01 |
| 7,394,752 B2* | 7/2008 | Hasegawa et al. | 370/201 |
| 2003/0086514 A1* | 5/2003 | Ginis et al. | 375/346 |
| 2003/0228005 A1* | 12/2003 | Melick et al. | 379/93.01 |
| 2004/0264559 A1* | 12/2004 | Cendrillon et al. | 375/219 |
| 2005/0123004 A1* | 6/2005 | Lechleider et al. | 370/529 |
| 2006/0098725 A1* | 5/2006 | Rhee et al. | 375/222 |
| 2007/0081582 A1* | 4/2007 | Ginis et al. | 375/222 |
| 2007/0280334 A1* | 12/2007 | Lv et al. | 375/133 |

* cited by examiner

*Primary Examiner*—Ricky Ngo
*Assistant Examiner*—Gary Mui
(74) *Attorney, Agent, or Firm*—The Halvorson Law Firm

(57) ABSTRACT

A method for distributed spectrum management of digital communication systems having a plurality of communication lines on which signals are transmitted and received by respective users, the method comprising the steps of: collecting information about line, signal and interference characteristics of a plurality of the communication lines from a plurality of sources; determining the line, signal and interference characteristics of a plurality of the communication lines; varying power allocation of particular plurality of the communication lines between respective transmitter and receiver taking into consideration the determined line, signal and interference characteristics of a plurality of the communication lines and consideration of a noise weight of a plurality of the communication lines to enable a minimum power on a plurality of the communication lines and to allow required effective datarates for each of said respective users to be satisfied.

47 Claims, 10 Drawing Sheets

METHOD FOR DISTRIBUTED SPECTRUM MANAGEMENT OF DIGITAL COMMUNICATIONS SYSTEMS

FIELD OF THE INVENTION

The present invention relates to a method and system for improving digital communications systems. More specifically, the invention relates to dynamically determining operational parameters that affect performance in communication systems such as Digital Subscriber Line (DSL) systems. Still more particularly it relates to a method for distributed spectrum management of digital communication systems.

BACKGROUND ART

Digital subscriber line (DSL) technology can use the existing copper twisted pair networks used in the analog telephone network. The copper wiring is said to form communication lines or loops. At spaced ends of the communication lines are located transceivers (for example, modems) or other transmitters and receivers for respectively sending and receiving digital signals communicated along the loops.

Twisted pairs are typically bundled together in a common physical sheath, known as a binder; all twisted pairs within a bundle are said to belong to a certain binder group. Within such a binder group, these twisted pair lines are sufficiently close such that electromagnetic radiation from one pair can induce "crosstalk" interference into one or more other pairs. Therefore a signal sent along a communication line and received by a modem can comprise the transmitted signal and one or more interference signals from adjacent communication lines. In turn, these crosstalk signals forms spurious noise that interferes with intended transmissions. In general, crosstalk effects in addition to long loop lengths are the main obstacles to reaching higher data rates in such copper-based networks.

Near end crosstalk (NEXT) is caused by transmitters interfering with receivers on the same side of the bundle and is often avoided by using non-overlapping transmit and receive spectra (frequency division duplex; FDD) or disjoint time intervals (time division duplex; TDD).

Far end crosstalk (FEXT) is caused by transmitters on opposite sides of the bundle. In some cases this interference can be 10 to 20 decibel larger than the background noise and has been identified by some as the dominant source of performance degradation in DSL systems.

Telephone companies are increasingly shortening the loop using remote terminal (RT) deployments, resulting in lower signal attenuation and larger available bandwidths. Unfortunately this can cause other problems such as the "near far" effect due to the crosstalk. Common in code-division multiple access (CDMA) wireless systems, the near-far effect occurs when a user enjoying a good channel close to the receiver overpowers the received signal of a user further away having a worse channel and where both users transmit at the same power levels.

One of the shortcomings of current multi-user communication systems is power control. In typical communication systems, interference limits each user's performance. Further the power allocation of each communication line depends not only on its own loop characteristics, but also on the power allocation of all other communication lines as exemplified by the near-far effect described above. Therefore the digital communications system design should not treat each user independently, but rather consider the power allocation of all communication lines jointly.

Two competing solutions to the signal degradation caused by crosstalk interference are known. These are vectored DSL and spectrum balancing. Each falls under the umbrella of dynamic spectrum management (DSM).

Vectoring treats the DSL network as a multiple-input multiple-output (MIMO) system where each DSL is coupled together. Each modem within a binder group must coordinate at the signal level to effectively remove crosstalk, through successive decoding or precoding of the aggregate datastream across all lines.

In contrast, spectrum balancing involves a much looser level of coordination. Modems employ a low-complexity single-user encoding and decoding strategy while treating interference as noise. Early static spectrum management (SSM) efforts attempted to define static spectra of various DSL services, in an attempt to limit the crosstalk interference between DSLs that may be deployed in the same binder. The notion of DSM goes further by allowing loops to dynamically negotiate a spectrum allocation that effectively avoids crosstalk, thereby enabling significant improvements in overall network performance.

Early work in the area of DSM introduced an iterative water-filling (IWF) scheme to balance user power spectrum densities (PSDs), where each user repeatedly measured the interference received from other users, and then determined their own power allocation according to a water-filling distribution without regard for the subsequent impact on other users. This process results in a fully distributed algorithm with a reasonable computational complexity.

More recent efforts have focused on the underlying optimization problem that spectrum balancing aims to solve. Unfortunately this optimization is a difficult nonconvex problem. As such, the Optimal Spectrum Balancing (OSB) algorithm makes use of a grid-search to find the optimal power allocation to a predetermined quantization of user powers. It suffers from an exponential complexity in the number of users, and so near-optimal Iterative Spectrum Balancing (ISB) algorithms were developed that reduce complexity through a series of line-searches, avoiding the grid-search bottleneck. Both of these algorithms are centralized and are not well-suited for practical implementation.

It is an object of the invention to alleviate at least in part one or more of the problems of the prior art or at least provide an alternative approach. More particularly, embodiments of the invention attempt to provide a readily useable practical system without being overly complex.

The main difficulty with known solutions of the multi-user power control problem lies in the fact that the underlying optimization problem is nonconvex and an inherently difficult NP-hard problem. The present invention aims to provide a simple method amenable to practical implementation.

SUMMARY OF THE INVENTION

The invention provides a method for distributed spectrum management of digital communication systems having a plurality of communication lines on which signals are transmitted and received by respective users, the method comprising the steps of: collecting information about line, signal and interference characteristics of a plurality of the communication lines from a plurality of sources; determining the line, signal and interference characteristics of a plurality of the communication lines; varying power allocation of particular plurality of the communication lines between respective transmitter and receiver taking into consideration the determined line, signal and interference characteristics of a plurality of the communication lines and consideration of a noise weight of a plurality of the communication lines to enable a minimum power on a plurality of the communication lines and to allow minimum target data-rates for each of said respective users to be satisfied, or to allow the maximization of data-rates for each of said respective users.

The method has the step of varying power allocation of particular communication lines between respective transmitter and receiver uses an aggregate of combined noise weights and crosstalk line characteristics over a plurality of communication lines to form a combined noise message for use in determining power allocation for each of a plurality of the communication lines.

A digital communication system is provided having distributed spectrum management of a plurality of communication lines extending between respective receivers and transmitters, the system including: a noise weight calculator for determining weighted noise of each of a plurality of communication lines; a noise weight aggregator for aggregating and combining weighted noise of the plurality of communication lines; and a power allocation determinator for determining allocated power of a communication line based on the determined power needs of the plurality of communication lines of the digital communication systems. Each communication line can have a power allocation determinator for receiving aggregated noise weight from the noise weight aggregator and able to locally determine allocated power of its respective communication line based on the determined power needs of the plurality of communication lines of the digital communication systems. The noise weight aggregator can be located at a SMC.

It can be seen that the invention is concerned with Dynamic Spectrum Management (DSM) and the balancing of the power spectral densities (PSDs) of DSL modems, specifically taking crosstalk effects into account. A significant improvement in the network capacity is possible by such a judicious allocation of users' power and especially so in the "near-far" situations.

The invention has overcome the main difficulty with known solutions of the multi-user power control problem of the underlying optimization problem being nonconvex and an inherently difficult NP-hard problem. The present invention makes use of a novel technique involving a series of convex relaxations, referred to herein as SCALE (Successive Convex Approximation for Low-complExity). It has been observed through computer simulation that SCALE can perform significantly better than IWF, and with comparable computational complexity.

An important feature of SCALE is that it may be distributed with the help of a Spectrum Management Center (SMC). The resulting method can be viewed as a distributed computation across the DSL network, in contrast to the centralized OSB and ISB schemes. The overhead associated with this approach can be managed, and as the level of inter-user communication is reduced, performance degrades gracefully toward the IWF solution in the limit of communicative isolation.

The invention also involves a fresh look at IWF. A new algorithm called SCAWF (Successive Convex Approximation for Water-Filling) is derived that simplifies existing IWF approaches and enjoys low complexity implementation.

BRIEF DESCRIPTION OF THE DRAWINGS

In order that the invention is more readily understood embodiments will be described by way of illustration only with reference to the drawings wherein.

LIST OF SYMBOLS, ABBREVIATIONS AND ACRONYMS

Figure 1:
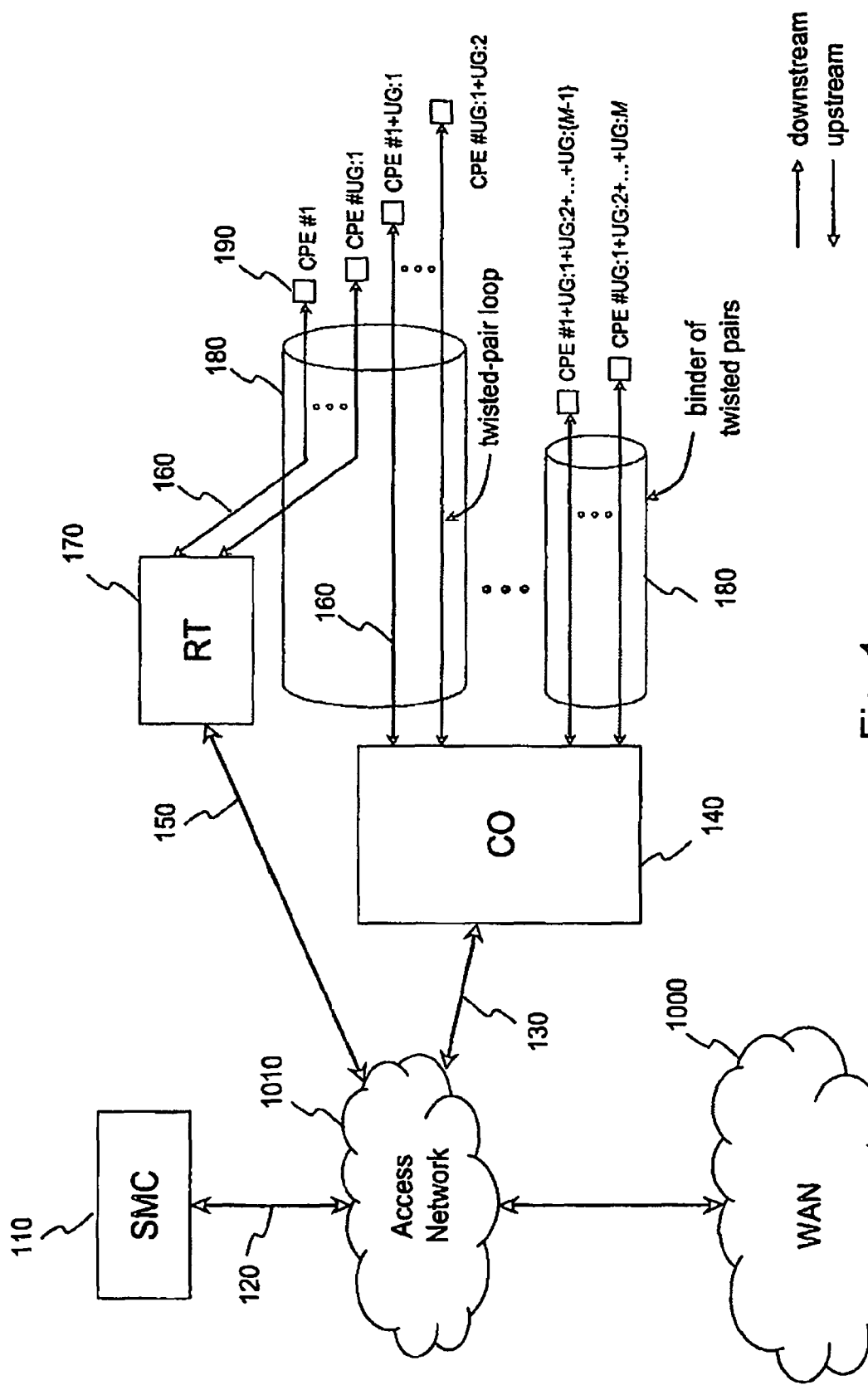
FIG. 1 is a schematic diagram, by way of example, of a digital subscriber line (DSL) communications system utilizing an existing telephone loop plant in connection with a central office (CO) and a number of other loops in connection with a remote terminal (RT); such a system may benefit from the spectrum balancing method according to the preferred embodiment of the invention.

For ease of reading a summary of abbreviations and acronyms used are listed herebelow:

| | |
|---|---|
| ADSL | Asymmetric Digital Subscriber Line |
| CDMA | Code Division Multiple Access |
| CO | Central Office |
| CPE | Customer Premises Equipment |
| d.c. | Difference of Concave functions |
| DMT | Discrete Multitone |
| DSL | Digital Subscriber Line |
| DSLAM | Digital Signal Line Access Multiplexers |
| DSM | Dynamic Spectrum Management |
| ESIR | Effective SIR |
| FDD | Frequency Division Duplex |
| FM | Fixed Margin |
| NT | Network Termination |
| ONU | Optical Networking Units |
| OSB | Optimal Spectrum Balancing |
| PSD | Power Spectrum Density |
| QoS | Quality of Service |

-continued

| | |
|---|---|
| RA | Rate Adaptive |
| SIR | Signal to Interference plus noise Ratio |
| SMC | Spectrum Management Center |
| SNR | Signal to Noise Ratio |
| SSM | Static Spectrum Management |
| TDD | Time Division Duplex |
| NEXT | Near End crossTalk |
| FEXT | Far End crossTalk |
| HDSL | High bit-rate Digital Subscriber Line |
| ISB | Iterative Spectrum Balancing |
| ISDN | Integrated Services Digital Network |
| IWF | Iterative water-filling |
| KKT | Karush-Kahn-Tucker |
| LAN | Local Area Network |
| LT | Line Termination |
| MIMO | Multiple-Input Multiple-Output |
| NMC | Network Management Centre |
| NP-Hard | Non-deterministic Polynomial-time Hard |
| RF | Radio frequency |
| RT | Remote Terminal |
| SCALE | Successive Convex Approximation for Low-complExity |
| SCAWF | Successive Convex Approximation for Water Filling |
| UG | User Group |
| VDSL | Very high bit-rate DSL |

For ease of reading a summary of symbols and notation used are listed herebelow:

$|A|$ = number of elements in the set A
$\emptyset$ = the null (empty) set
$1_A$ = indicator function of the event A
M = total number of user groups
K = total number of users in the system
$N^s$ = total number of DMT tones employed by each user
$P_k^n$ = transmit power of user k on tone n
$P_k$ = PSD vector for user k
P = the K × N vector of all user PSDs
$P_k^{req}$ = required transmit power of user k
$P_k^{max}$ = maximum transmit power of user k
$G_{jk}^n$ = channel transfer gain from user k to user j on tone n
$G_{jk}$ = N-length vector of channel transfer gains from user k to user j on all tones
$\sigma_k^n$ = frequency dependent noise power incident to the receiver of user k on tone n
$\tilde{\sigma}_k^n$ = total interference plus noise power incident to the receiver of user k on tone n
$b_k^n$ = bit loading of user k on tone n
$\mu_k^n$ = rate-target penalty for user k on tone n
$\lambda_k^n$ = max-power penalty for user k on tone n
$\epsilon$ = a very small positive constant
s = iteration number
$\delta_k$ = QoS parameter for user k
$SIR_k^n$ = signal to interference plus noise ratio of user k on tone n
$SNR_k^n$ = signal to noise ratio of user k on tone n
$\Gamma_k^n$ = SNR-gap normalization constant of user k on tone n
$R_k$ = Data-rate of user k
$\omega_k$ = scalarization weight of user k
$N_k^n$ = weighted noise from user k on tone n
$N_k$ = N-length vector of weighted noises from user k on all tones
$M_k^n$ = combined noise for user k on tone n
$M_k$ = N-length vector of combined noises for user k on all tones
$L(\Lambda)$ = Langrangian function
$\alpha_k^n$ = noise weight (also referred to as an approximation constant) for user k on tone n
$\beta_k^n$ = approximation constant for user k on tone n
$PSD_k^n$ = PSD mask value for user k on tone n
$CLP_k$ = A set of tonal indices for user k corresponding to clipped PSD components

DETAILED DESCRIPTION OF THE INVENTION

The present invention is described in connection with its preferred embodiment, namely as implemented into a multi-user digital subscriber line (DSL) system where discrete multitone (DMT) modulation is employed for communication between subscribers' customer premises equipment (CPE) and a central office (CO), and also between subscribers' CPE and remote terminals (RTs). These RTs are typically optical networking units (ONUs) or remote DSL access multiplexers (DSLAMs) deployed in modern DSL networks to shorten the length of copper twisted pair loops, with the aim of improving performance by decreasing the electrical signal attenuation on such lines. In the preferred embodiment, the said system will include an entity referred to as a spectrum management center (SMC) that coordinates the functions of one or more network elements (such as CPE, CO and/or RT) as described in detail below. In other embodiments, the SMC may directly control the functions of such network elements, or may not be present at all.

It should be kept in mind that this invention may also be applicable to a wide range of other types of networks, especially those in which crosstalk (or more generally multi-user interference) hinders performance.

FIG. 1 illustrates an exemplary system, with which the preferred embodiment of the present invention can be implemented. By way of example, a number of user-groups are illustrated where some subscribers' CPE 190 are connected to a CO 140, that is in turn connected to an access network 1010 via high-speed infrastructure (for example, supported by an optical fiber leased-line) 130. Alternatively, user-groups may have their CPEs 190 connected to a RT 170 that is in turn connected to the access network 1010 through similar, but not necessarily shared, high-speed infrastructure. The access network 1010 is typically connected to some wide area network (WAN) 1000, such as the internet.

Pictured are M user-groups (UGs), with each group m=1, . . . , M comprising UG:m subscribers. Each subscriber communicates with the network by way of their CPE 190. Communication to and/or from the CPE 190 and the rest of the network occurs over a twisted pair loop 160 that is grouped into binders 180 along with the pairs of other users. The CPE side of the loop is named the network termination (NT). Each subscriber loop 160 is terminated at either a CO 140 or RT 170. This side of the loop is named the line termination (LT) end. It will be understood by those skilled in the art that typical DSL networks may comprise thousands of COs and RTs that can serve millions of subscribers.

Each subscriber loop is, of course, a bidirectional DSL connection. As such, information is communicated downstream from the CO 140 or RT 170 (LT side) to the CPE 190 (NT side), as well as on the upstream in the reverse direction, from the CPE 190 (NT side) to the CO 140 or RT 170 (LT side). Typically, each CO 140, RT 170 and CPE 190 is constructed as, or includes, a DSL modulator and demodulator (modem). These modems typically achieve bidirectional communication through frequency-division duplex (FDD) techniques that utilize disjoint frequency bands for downstream and upstream communication. An alternative scheme employing an overlapping spectrum using time-division duplex (TDD) is also known in the art that utilizes disjoint time periods dedicated to respective downstream and upstream directions.

As is well understood by those skilled in the art, such DSL connections are effected by broadband modulation techniques such as the DMT modulation scheme. In DMT, the bandwidth is partitioned into N independent subchannels, referred to as tones, having narrow bandwidth. In the ADSL standard, N=256 subchannels of 4.125 kHz width are utilized on the downstream, while N=64 subchannels are used on the upstream. For the ADSL2+standard, the number of downstream subchannels is doubled to N=512, while VDSL increases this dramatically to a maximum of N=4096 subchannels. The data-stream to be transmitted using DMT is split into N substreams and each is mapped onto the independent subchannels. Due to crosstalk interference and line characteristics that vary across frequency, each subchannel may have a different capability to carry information. It is therefore of relevance to know how to best distribute the data-stream over the available subchannels, known as the "bit-loading" across the available subchannels. Going further, the information bearing capacity of each subchannel can be controlled to a certain extent by a judicious allocation of transmitter power for use in each subchannel. As is known to those skilled in the art, this is the essence of "power control"—to determine the best transmitter power spectrum density (PSD) over the available subchannels in frequency.

In the exemplary system of FIG. 1, subscriber loops comprise twisted wire pair conductors 160 are reside in a binder 180 common to other subscriber loops, at least some part of the distance along their length. As those skilled in the art know, such binders refer to a collection of twisted wire pair conductors that are contained in a common physical sheath. The close proximity of loops 160 within a binder 180 can induce electromagnetic coupling from one line to another, in turn inducing crosstalk interference. As can be appreciated by those skilled in the art, such crosstalk impairments can be a dominant source of noise. As the demand for higher data rates increases and communication systems move toward larger bandwidths and higher frequency bands, where the crosstalk problem is more pronounced, spectrum management becomes an issue of paramount importance. This is especially true in VDSL systems, where frequencies up to 30 MHz can be used.

Spectrum management attempts to define the spectra of various DSL services in order to limit the crosstalk interference between loops that may be deployed in the same binder. First attempts at spectrum management involved studies that defined typical and worst-case scenarios from which fixed spectra are obtained for each type of DSL, ensuring a limit to the mutual degradation between services. However, static measures such as these may lead to achievable data-rates that are far lower than what may be supported by the actual loop topology in practice. Dynamic spectrum management (DSM) addresses these shortcomings by shaping the power spectra of DSL loops according to the actual real-life scenario at hand. This process may be triggered by changes in the network topology (power-up and/or shut-down of a CPE modem), at periodic intervals, or even continuous adaptation in real-time or close to real-time.

To this end, the preferred embodiment (and some other embodiments) outlined herein also include a spectrum management centre (SMC) 110 that may interact with the modems at either the LT or NT, or both ends of one or more subscribers' loops. Such interaction, outlined in detail below, is undertaken via a bidirectional connection 120 to the access network, and the adjoining CO 140 or RT 170 as required. As those skilled in the art can appreciate, such interaction may reuse existing network switching infrastructure by embedding any communication messages in an out-of-band control channel (e.g. control packets or as headers included with any payload data). Going further, the functionality of the SMC may or may not be included in a network management center (NMC) that may be present in an existing DSL network (not shown in FIG. 1).

It is noted that while DSM alleviates many problems associated with dictating fixed spectra for each DSL type, the issue remains of spectral compatibility with legacy systems that adhere only to static spectrum management (SSM) practices. The net result is that DSM-enabled systems should take into consideration SSM-restricted loops. The present invention addresses with this issue by allowing optional limits on individual components of the PSD, known to those skilled in the art as a "PSD mask" constraint.

The present invention uses information on line characteristics (for example, direct and crosstalk power transfer characteristics) and user requirements (for example, PSD masks, minimum subscriber data-rate requirements, maximum total transmission power) to enhance the performance of the communications system through the analysis of such information, and subsequent determination of operational parameters such as modem PSDs and bit-loadings. In the preferred (and other) embodiment(s), such determination is effected by a "distributed scheme", where decisions are not made centrally although some sort of central coordination (for example, by a SMC) may be of benefit. In such a distributed scheme, modems can formulate appropriate directives independently, based on local measurements of line characteristics and knowledge of appropriate user requirements, and possibly with additional information offered by a centralized coordinator. Other further embodiments are effected by an alternative "centralized scheme" where decisions are made by a centralized entity such as a SMC and where appropriate directives of operational parameters are communicated to relevant DSL modems.

The performance of the communications system may be characterized by the total data-rate of all users in the network. However, some system operators may wish to offer differentiated services, for example, by offering a faster service at a higher price (a relative measure), or a guaranteed minimum data-rate (an absolute measure). In light of these issues, the system operator may be interested in a communication system that can offer the greatest selection of data-rates for subscribers, or provide a base-line (absolute) minimum data-rate to as many subscribers as possible. In order to achieve these goals, it is necessary to make best use of available transmission power: an optimization of the transmit PSD of each DSL modem, sometimes referred to as "spectrum balancing".

Figure 2:
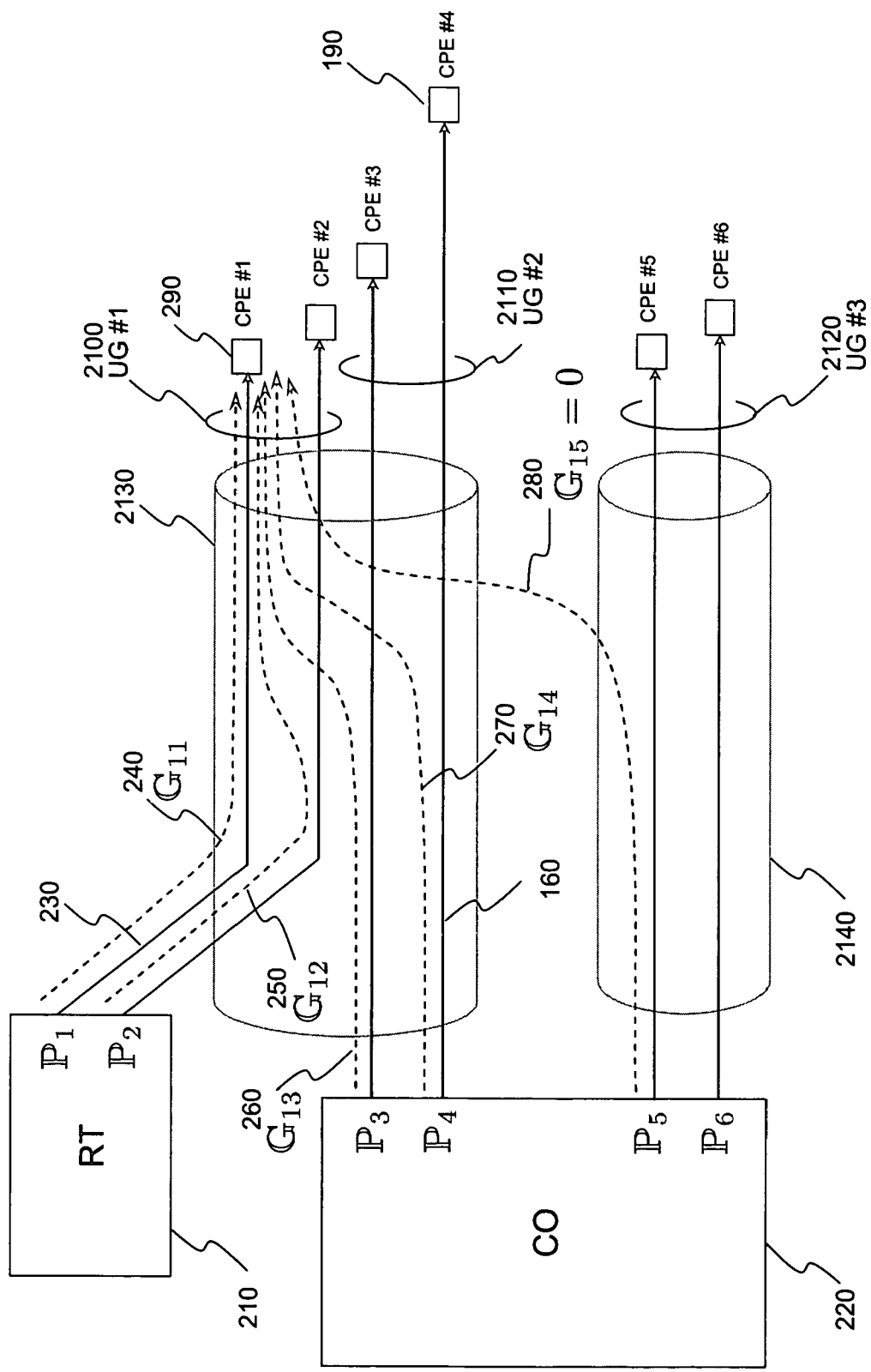
FIG. 2 is a schematic diagram depicting a portion of a DSL communications system, showing two binders that accommodates three user-groups. A number of sources of far-end crosstalk (FEXT) interference are shown in connection with the DSL modem customer premises equipment (CPE) of the first subscriber.

A better understanding spectrum balancing and how it may lead to improved system performance is given by way of an example. FIG. 2 illustrates a portion of the exemplary system when only K=6 users and M=3 user-groups (UGs) are present. To simplify the example, only the downstream direction of the bidirectional system is considered. The user-first group has LTs at the RT 210, the second and third user-groups have their LTs at the CO 220. User-group #1 2100 shares a binder 2130 with user-group #2 2110. The third user-group 2120 exists in a separate binder 2140.

Associated with each user k=1,K,6 is a modem at the LT that transmits DMT modulated signal with a PSD given by the N-length vector $$P_k = [P_k^1, P_k^2, K, P_k^N]$$  Eq. (1)

Each component of this vector corresponds to the transmit power associated with the n-th DMT subchannel (hereon referred to as a "DMT tone" or just "tone").

Also associated with each user k is a set of N-length channel transfer vectors $$G_{jk} = [G_{jk}^1, G_{jk}^2, K, G_{jk}^N]$$  Eq. (2)

The n-th component of this vector corresponds to the loop transfer gain on tone n from the transmitter of user k, to the receiver of user j. For example, the direct loop transfer gain of user #1 corresponds to $G_{11}$ 240 and completely characterizes the frequency-dependent channel transfer characteristics of the N downstream subchannels along loop #1 230 from RT 210 to CPE #1 290. Due to the close proximity to other lines in the binder 2130, signal power from these other lines will couple into line #1 as crosstalk interference. The degree to which this frequency-dependent interference will couple into line #1 is completely characterized by the crosstalk transfer gains represented by the vectors $\{G_{1j}: j=2,K,6\}$.

Still with reference to FIG. 2, the interference illustrated corresponds to the so-called "far-end" crosstalk (FEXT): interference that is injected into the receiver from the "other end" of the binder. Interference can also be injected into the receiver by upstream transmitters located on the same side of the binder: so-called "near-end" crosstalk (NEXT). Although not pictured in FIG. 2, these two types of interference can occur at the LT side of the loop when the respective directions and roles of receivers and transmitters are reversed. In general, NEXT can be ignored due to the FDD or TDD separation of upstream and downstream transmissions. The embodiments of the present invention ignore NEXT, although such interference can be readily included by a person skilled in the art having reference to this specification and its drawings, should non-overlapping up- and downstream transmissions be employed.

As outlined above, RTs are deployed in order to increase performance by shortening the loop length. In the example of FIG. 2, the RT-based loops 2100 are then physically much shorter than the CO-based loops 2100 and 2120, resulting in more favorable (i.e. larger) direct channel transfer vectors $G_{11}$ and $G_{22}$ for users 1 and 2 respectively; and ultimately an opportunity to achieve a greater downstream data-rate for those users. Physically shortening the RT-based loops 2100 also brings the RT 210 closer to the CPE of the CO-based loops 2110. This can result in excessively high levels of FEXT from the RT 210 to the CO-based CPE, as compared to the corresponding FEXT from other CO-based users. Since the CO-based loops 2110 are much longer, their direct channel transfer vectors are much weaker (i.e. smaller), resulting in a greater susceptibility to FEXT. In such so-called "near-far" scenarios, it becomes important to appropriately manage the spectra of CO- and RT-based loops, to balance the tradeoff between the rates of each user-group. The aim of spectrum balancing is to find the "perfect" balance of spectrum usage that achieves the goals of the system operator (for example, maximizing the network data-rate or meeting minimum data-rate targets).

It may be that the crosstalk transfer gains from lines within one binder group to other lines within another binder group are zero (or negligible so that they may be practically presumed to be zero). In that case, the transmissions on loops in one binder group have no effect on other lines in other binder groups: the mutual crosstalk is nonexistent. For the user-groups pictured in FIG. 2, the third user-group associated with binder 2130 is completely isolated from the other user-groups contained in a different binder 2140 and so the crosstalk transfer gains $G_{15}$ 280 in this case are all zero. Where there are isolated binder groups such as these, each isolated group may be optionally partitioned into separate sets of user-groups, and each set treated as belonging to an independent system in its own right.

Figure 3:
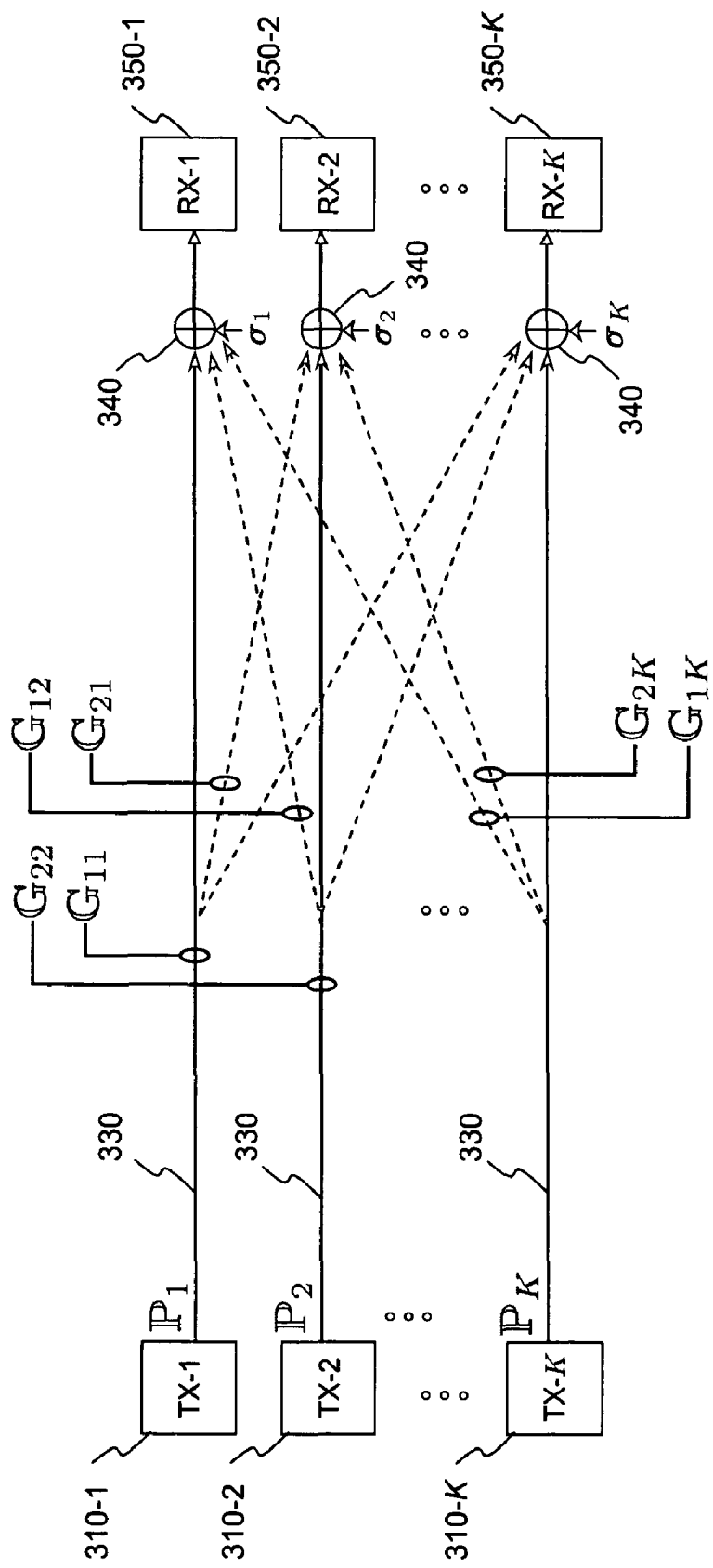
FIG. 3 is diagram showing a channel model of the DSL communications system, showing the crosstalk interference between DSL lines and another noise source incident to each receiver.

FIG. 3 illustrates a generalized schematic abstraction, within which the preceding specific example system fits. The total quantity of users whose PSD may be controlled is denoted by K. Associated with each user $k=1,K,K$ is a transmitter 310-$k$, connected to a receiver 350-$k$ via the subscriber loop 330. Each transmitter makes use of a DMT modulated signal having N tones, with a transmit PSD of $P_k$ as given by equation 1. The transmitted signal of a particular transmitter k reaches all other receivers as determined by the channel transfer gain vectors $\{G_{jk}: j=1,K,K\}$ and as outlined above. Thus a given receiver j will be subject to the desired communication signal emanating from its paired transmitter j, and FEXT interference from all other transmitters. In practice, other frequency-dependent noise sources are also present, lumped together and represented by the vector $\sigma_k = [\sigma_k^1, \sigma_k^2, K, \sigma_k^N]$. As can be appreciated by a person of ordinary skill in the art, such frequency-dependent noises are the combination of thermal noise present in the receiver electronics and also noise from other radio-frequency (RF) sources such as radio transmitters, or other neighboring DSL systems that may be present, that are not any of the K users under consideration. All of the signals (desired signal, FEXT interference and other noises) physically combine by superposition at the input of the receiver. This physical phenomenon is equivalently represented as the summation 340.

By way of example, the preferred embodiment will relate to a bidirectional DSL system as pictured in FIG. 1, where only the downstream direction is considered. It will of course be understood by those skilled in the art having reference to this specification and its drawings, that the upstream direction is similarly treated, with both directions of the system being simultaneously dealt with by the straightforward combination of the embodiments outlined herein.

Figure 4:
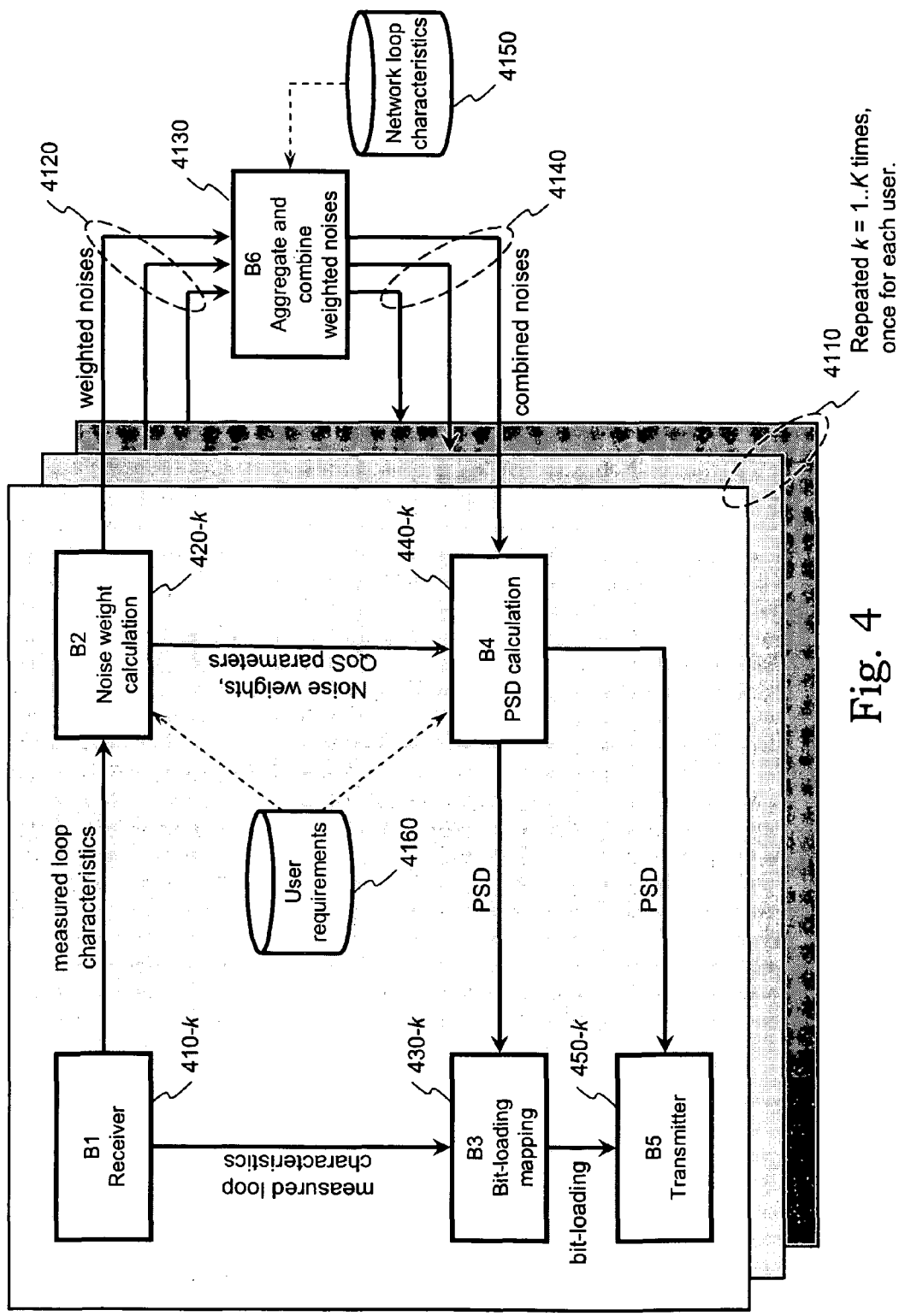
FIG. 4 is a top-level electrical diagram, in block form, showing the components of the preferred embodiment of the invention and their mutual relation.

FIG. 4 pictures a top-level view of the main functional blocks of the preferred embodiment. Each of the blocks B1 to B5 inclusive (grouped as 4110) are associated with a particular user $k=1,K,K$ in the system. That is, with each user is associated a separate realization of blocks B1 to B5, as indicated by the "-k" suffix on figure identifiers.

Block B1 410-$k$ represents a generalized receiver attached to user k, which can receive DMT modulated signals from the communication facility; in this case the subscriber twisted-pair loop 160 associated with user k, and can measure relevant line characteristics. Similarly, block B5 450-$k$ represents a generalized transmitter attached to user k that can transmit DMT modulated signals into the communication facility 160. A detailed architecture of these blocks is not given, as it would be readily apparent to those of ordinary skill in the art how such embodiments could be manufactured with well-known electronic components.

The other blocks B2 420-$k$, B3 430-$k$, B4 440-$k$ and B6 4130 carry out operations on the measurements, along with line characteristics and user requirements to optimize the PSD of each user, ultimately forming an appropriate bit-loading so that transmitters (blocks B5 450-$k$) may efficiently operate and meet any requirements such as minimum data-rate targets. In order to better understand this invention, the theory of its operation will be now be described, following which the implementation according to the preferred embodiment will then be described.

Theory of Operation

Referring to FIG. 3, a transmitter associated with user k 310-$k$ is able to transmit a data-stream on N independent tones. For the purposes of PSD optimization, each tone is assumed to support a continuous-valued bit-loading of $$b_k^n(P^n) = \log(1 + SIR_k^n(P^n)) \qquad \text{Eq. (3)}$$

per channel use, given in the units of nats (1 nat=1/log(2) bits), since we deal with the natural logarithm unless otherwise explicitly stated. The signal-to-interference ratio (SIR) is defined as $$SIR_k^n(\mathbb{P}^n) = \frac{G_{kk}^n P_k^n}{\sum_{\substack{j=1 \\ j \neq k}}^{K} G_{kj}^n P_j^n + \sigma_k^n} = \frac{G_{kk}^n P_k^n}{\tilde{\sigma}_k^n(\mathbb{P}^n)}, \quad \text{Eq. (4)}$$

where the total received interference-plus-noise power imposed on receiver k is written as $$\tilde{\sigma}_k^n(\mathbb{P}^n) = \sum_{\substack{j=1 \\ j \neq k}}^{K} G_{kj}^n P_j^n + \sigma_k^n. \quad \text{Eq. (5)}$$

For notational convenience, $P^n=[P_1^n, P_2^n, \ldots, P_K^n]$ will denote the K-length vector of all transmitter powers on tone n. The notation $P_k=[P_k^1, P_k^2, \ldots, P_k^N]$ will also be used as the N-length PSD vector of user k. Lastly, the K×N matrix P will denote as the stacking of these vectors in the obvious way. This notation makes clear the explicit dependence of the SIR on power.

As outlined previously, the channel-gains $G_{kj}^n$ represent the channel power transfer on tone n from user j to the receiver of user k. For notational convenience, it will be assumed that the gains $G_{kk}^n$ have been normalized by an appropriate "SNR-gap" $\Gamma_k^n$ that depends on the coding scheme, target probability of error and noise margin. Also as outlined above, each $\sigma_k^n$ models the total received noise power on tone n, modeling receiver thermal noise plus any background noise injected by other co-existing systems (e.g. HDSL, ISDN, RF noise, etc.). It is assumed that these noise powers are constant.

The achievable rate for user k is then given by $$R_k(\mathbb{P}) = \sum_{n=1}^{N} b_k^n(\mathbb{P}^n) = \sum_{n=1}^{N} \log(1 + SIR_k^n(\mathbb{P}^n)) \quad \text{Eq. (6)}$$

nats per channel use.

The spectrum balancing problem has many forms, categorized by the Rate Adaptive (RA) and Fixed Margin (FM) formulations. For each problem, a power-allocation D* solution is found that meets a stated objective, where each user k is limited to a finite maximum power (max-power) constraint of $P_k^{max}$, and a maximum power spectrum density (PSD) limit of $PSD_k^n$ per tone n that may be imposed by regulatory restrictions or by the system-operator. It is usual for the PSD mask to be non-trivial, satisfying the property $$\sum_{n=1}^{N} PSD_k^n > P_k^{max}, \forall k,$$

otherwise the optimal solution to the resulting spectrum balancing problem can be determined trivially by $P_k^n=PSD_k^n$. Nonetheless, such trivial PSD masks can still serve a useful purpose: should DSL modems accept a PSD mask as an operational parameter, the system operator could, perhaps centrally, find an efficient multi-user power-allocation and instruct each modem to enact the desired power-allocation by setting the (trivial) PSD mask to be exactly the desired power-allocation.

The objective of the RA problem is to maximize the data-rate of each user. The objective is then a K dimensional quantity, each component corresponding to the data-rate of a user k∈1,K,K, where there is an obvious trade-off between each, due to mutual crosstalk coupling. Thus the problem is inherently a multicriterion vector optimization problem. It is well-known by those skilled in the art that such problems are more easily treated by first transforming the objective to a scalar function by way of scalarization. For the problem at hand, scalarization involves forming a single objective function that is a weighted sum of the vector components (the per-user data-rates)—see equation (7) below.

We write the RA problem mathematically as the optimization:

$$\max_{P} \sum_{k=1}^{K} \omega_k \sum_{n=1}^{N} \log(1 + SIR_k^n(\mathbb{P}^n)) \quad \text{Eq. (7)}$$

$$\sum_{n=1}^{N} P_k^n \leq P_k^{max}, \forall k$$

s.t.

$$0 \leq P_k^n \leq PSD_k^n, \forall k, n$$

where $\omega_k$ are a set of positive "scalarization weights" that enable a trade-off between the maximum achievable rates of users in the system. Equivalently, these weights allow the system operator to associate a differing Quality of Service (QoS), or importance level, to each user. This is a more robust way of differentiating users than existing techniques known in the art that "pair back" the per-user maximum-power budgets $P_k^{max}$. Using the scalarization weights, for example, one can more heavily weight those users having longer loop lengths (with a higher relative $\omega_k$), such their resulting maximum achievable rates are on-par with more lightly weighted users enjoying shorter loop lengths. To achieve a similar goal with maximum-power scaling, one would need to artificially reduce the max-power budget of those users on short loops so there is less overall crosstalk power into the longer loops.

The scalarization weights $\omega_k$ are considered to be constant, that are selected by the system operator on a suitably long time-scale; i.e. they may be adjusted or tuned over time to offer different QoS levels to users over such time-periods.

The objective of the FM problem is to find a minimal power allocation, such that per-user minimum target data-rates are achieved. These target rates must be feasible; that is, there exists a power-allocation whereby the target rates are attainable, and where the max-power constraint of each user is not violated. The rate-region dictates the set of target rate vectors that are feasible for the FM problem. It is usual for this region to be determined through the solution of a sequence of RA problems that involve a sweep of QoS parameters $\omega_k$ amongst users.

The FM problem is written mathematically as the optimization:

$$\min_{P} \sum_{k=1}^{K} \sum_{n=1}^{N} P_k^n \quad \text{Eq. (8)}$$

-continued $$R_k^{target} \leq \sum_{n=1}^{N} \log(1 + SIR_k^n(\mathbb{P}^n)), \forall k$$

s.t.

$$0 \leq P_k^n \leq PSD_k^n, \forall k, n$$

where $R_k^{target}$ are fixed data-rate targets for each user k (given in nats per channel use) and are chosen by the system-operator from a feasible rate-region.

The RA and FM problems have been studied extensively for single-user K=1 systems, for both continuous and discrete bit-loading. Those well-established algorithms usually involve some kind of "water-pouring", a technique well-known in the art.

For the multi-user case where K>1, the optimizations are difficult, because either the objective or constraint is nonconvex in P. It has been observed, according to this invention, that the nonconvex terms have d.c. (difference of concave functions) structure. Such problems are known to be NP-hard and difficult to solve efficiently for the global optimum.

A method known in the art, called iterative water-filling (IWF), finds an approximate solution to this problem and is detailed in the article entitled "Distributed multiuser power control for digital subscriber lines", by W. Yu, G. Ginis, and J. M. Cioffi, published in the IEEE Journal of Selected Areas in Communications, June 2002. IWF finds an approximate solution by splitting this problem into K convex subproblems, then iterating over these until convergence. Each subproblem concerns only the powers $P_k$, fixing all other powers $P_{j \neq k}$ and treating their contributions to the SIR as fixed background noise. These subproblems are made distributed through measurement of the SIR. IWF has been shown to converge to a Nash competitive equilibrium, and is amenable to practical implementation.

Another widely known method is known in the art, called optimal spectrum balancing (OSB), attempts to solve these optimization problems directly, and is detailed in the article entitled "Optimal Multiuser Spectrum Management for Digital Subscriber Lines", by R. Cendrillon, M. Moonen, J. Verliden, T. Bostoen and W. Yu, published in the IEEE International Conference on Communications, June 2004. The innovation of OSB was to formulate the Lagrangian dual problem. It was then possible to iterate over N separate subproblems for fixed Lagrangian dual variables, with each decoupled subproblem concerning only user powers $P^n$ on tone n∈[1,N]. Each subproblem is solved with a brute-force grid-search having $L=P^{max}/\Delta_P$ quantized power levels, requiring at least $L^K$ operations each. An outer loop then updated the Lagrangian dual variables via bisection (or gradient-based) methods.

Although OSB has exponential complexity in the number of users, it has shown significant performance gains are possible over IWF. More recently, Iterative Spectrum Balancing (ISB) algorithms were introduced with lower complexity, e.g. from the article "Iterative Spectrum Balancing for Digital Subscriber Lines", by R. Cendrillon and M. Moonen, published in the IEEE International Conference on Communications, May 2005. The computational savings were achieved by approximating the grid-search with a sequence of line-searches. In general, a run of K line-searches are repeated on tone n until convergence before moving on to the next: still a large computational burden, with no guarantees on an optimal solution, global or local.

Prior to this invention, there has been little in the way of low-complexity algorithms that avoid explicit line- or grid-searching to solve the multi-user problem. The present invention has an attractive balance between distributed computation and message-passing between users. It also guarantees at least a local optimum, while numerical simulation studies have shown it to produce significant performance gains over IWF as the OSB method has also shown.

More generally, a typical system may have a number of users with minimum rate targets $R_k^{target}>0$ (labeled as FM-users) and some number of users that are elastic to what data-rate the system may provide (labeled as RA users).

Of the K users in the system, those users having minimum rate-targets are collected into a "FM group", denoted mathematically by the set FM={$k:R_k^{target}>0$}. All other users are deemed to be rate-adaptive, and collected into a "RA group", denoted by the set RA={k:k=1K K}\FM.

The more general problem is now considered, that combines the RA and FM formulations into one. This readily allows the joint optimization of systems that contain both RA and FM users. Mathematically, the optimization problem is written, $$\max_{P} \sum_{k \in RA} \omega_k \sum_{n=1}^{N} \log(1 + SIR_k^n(\mathbb{P}^n)) - \sum_{k \in FM} \sum_{n=1}^{N} P_k^n I_{\{RA=\emptyset\}} \quad \text{Eq. (9)}$$

$$R_k^{target} \leq \sum_{n=1}^{N} \log(1 + SIR_k^n(\mathbb{P}^n)), k \in FM$$

$$\text{s.t.} \sum_{n=1}^{N} P_k^n \leq P_k^{max}, \forall k$$

$$0 \leq P_k^n \leq PSD_k^n, \forall k, n$$

The indicator function $$I_{\{RA=\emptyset\}} = \begin{cases} 1, & \text{when } |RA| = 0 \\ 0, & \text{otherwise} \end{cases}$$

takes on the value 1 when there are no RA users (i.e. the set RA has zero elements), otherwise it is 0. This allows the optimization given by equation (9) to reduce to the individual problems given by equations (8) and (7) when the system comprises only FM or only RA users respectively.

Our approach is to consider a relaxation of the nonconvex problem given by equation (9) to avoid the d.c. structure. The following lower bound is employed, that is tight with equality at a chosen value $z_0$ when the constants $\{\alpha, \beta\}$ are chosen as specified:

$$\alpha \log z + \beta \leq \log(1+z) \begin{cases} \alpha = \dfrac{z_0}{1+z_0} \\ \beta = \log(1+z_0) - \dfrac{z_0}{1+z_0} \log z_0 \end{cases} \quad \text{Eq. (10)}$$

Applying equation (10) to the optimization given by equation (9) results in the following relaxed optimization problem where all $\{\alpha_k^n, \beta_k^n\}$ are fixed.

$$\max_{0 \leq P \leq P^{PSD}} \sum_{k \in RA} \omega_k \sum_{n=1}^{N} [\alpha_k^n \log(SIR_k^n(\mathbb{P}^n)) + \beta_k^n] - \sum_{k \in FM} \sum_{n=1}^{N} P_k^n I_{\{RA=\emptyset\}} \quad \text{Eq. (11)}$$

$$R_k^{target} \leq \sum_{n=1}^{N} [\alpha_k^n \log(SIR_k^n(\mathbb{P}^n)) + \beta_k^n], k \in FM$$

s.t.

$$\sum_{n=1}^{N} P_k^n \leq P_k^{max}, \forall k.$$

Recognizing that the spectral-mask constraint is simply a box-constraint[1] on the power allocated to each tone, we have relocated it as an "implicit constraint", shown in equation (11) under the max operator. This still amounts to optimizing over power-levels that are within the spectral-mask; however it simplifies the algorithmic development that follows.

[1] A box-constraint is simply an upper and lower bound on the variables being optimized.

This maximization problem is still nonconvex, since the objective and first constraint set are not concave in P. However, a transformation $\tilde{P}_k^n = \log P_k^n$ results in an standard concave maximization problem in the new variables $\tilde{P}_k^n$, $$\max_{\tilde{P} \leq \log P^{PSD}} \sum_{k \in RA} \omega_k \sum_{n=1}^{N} [\alpha_k^n \log(SIR_k^n(e^{\tilde{P}^n})) + \beta_k^n] - \quad \text{Eq. (12)}$$

$$\sum_{k \in FM} \sum_{n=1}^{N} e^{\tilde{P}_k^n} I_{\{RA=\emptyset\}}$$

$$R_k^{target} - \sum_{n=1}^{N} [\alpha_k^n \log(SIR_k^n(e^{\tilde{P}^n})) + \beta_k^n] \leq 0, \forall k \in FM$$

s.t.

$$\sum_{n=1}^{N} e^{\tilde{P}_k^n} - P_k^{max} \leq 0, \forall k$$

where we denote $e^x$ and $\log x$ as element-by-element operations on the vector x.

To see how the transformation results in a problem of standard form, first note that the $2^{nd}$ constraint set is a convex sum of exponentials in $\tilde{P}_k^n$. The objective comprises a sum with the following terms:

$$\log(SIR_k^n(e^{\tilde{P}^n})) = \log G_{kk}^n + \tilde{P}_k^n - \log\left(\sum_{j \neq k} G_{kj}^n e^{\tilde{P}_j^n} + \sigma_k^n\right).$$

Each is a sum of negative-log-sum-exp (concave) and linear (concave) terms, and thus the objective is concave. Similarly, the $1^{st}$ constraint set contains a similar sum that is negated, and is thus convex. Due to the concavity of the objective and convexity of the constraints, equation (12) is a standard concave maximization problem.

The present invention solves the relaxed problem given by equation (12) using gradient methods that are computationally efficient, and without the need for a brute-force search of any kind. Once a solution is obtained, we may transform back to the P-space with the reverse transformation $P_k^n = \exp(\tilde{P}_k^n)$.

The solution to the relaxed problem (12) is a lower-bound on the optimal achievable system rate. It then becomes natural to improve the bound successively, resulting in the following procedure:

1: Initialize iteration counter t=0
2: Set each initial $\alpha_k^{n(t)} = 1$, $\beta_k^{n(t)} = 0$
3: repeat
   a. Maximize: solve subproblem given by equation (12) for solution $P^{(t)}$
   b. Tighten: update $\alpha_k^{n(t+1)}$, $\beta_k^{n(t+1)}$ at $z_0 = SIR_k^n(P^{(t)})$
   c. Increment t
4: until convergence We propose and have proven that the sequence of iterates $P^{(t)}$ produces a monotonically increasing objective and will always converge. One consequence of our proposition is that at convergence, the feasible power allocation P* satisfies the Karush-Kahn-Tucker (KKT) optimality conditions of the optimization problem given by equation (9). Thus P* is at least a local optimum of the problem.

Another consequence of our proposition is that each subproblem need not be maximized fully; only an improved objective is required. This lends itself toward a distributed tightening step: each user need not wait until convergence of subproblem t; each tightens at periodic intervals and each tightening step requires only local information.

The resulting algorithm that is based on the above procedure is named SCALE (Successive Convex Approximation for Low complExity). We give a detailed account of the main part algorithm in what follows, involving the solution to the subproblem given in step 3a above. Once a (possibly partial) solution is found, the tightening step is undertaken and the process is repeated until convergence.

The solution to the subproblem given by equation (12) will make use of a Lagrangian dual framework that transforms the constrained optimization problem into an equivalent unconstrained version that is easier to deal with.

Define a Lagrangian function as $$L_S(\tilde{P}, \mu, \lambda) = \sum_{k \in RA} \sum_{n=1}^{N} \omega_k (\alpha_k^n \log(SIR_k^n(e^{\tilde{P}^n})) + \beta_k^n) - \quad \text{Eq. (13)}$$

$$\sum_{k \in FM} \sum_{n=1}^{N} e^{\tilde{P}_k^n} I_{\{RA=\emptyset\}} - \sum_{k \in FM} \mu_k \left\{ R_k^{target} - \right.$$

$$\sum_{n=1}^{N} [\alpha_k^n \log(SIR_k^n(e^{\tilde{P}^n})) + \beta_k^n] \right\} -$$

$$\sum_{k=1}^{K} \lambda_k \left\{ \sum_n e^{\tilde{P}_k^n} - P_k^{max} \right\}$$

The corresponding Lagrangian dual optimization problem is then given by $$\min_{\lambda, \mu} \max_{\tilde{P} \leq \log P^{PSD}} L_S(\tilde{P}, \mu, \lambda), \quad \text{Eq. (14)}$$

where the dual variables $\lambda, \mu$ are non-negative. These represent a penalty for maintaining a solution that satisfies all of the max-power and target-rate constraints.

Let us illustrate with an example. Consider the inner maximization of the dual problem given by equation (14). It might be the case that the max-power constraint is violated for a particular user k. In this case, by increasing the penalty $\lambda_k$, we place more importance on the k-th user's max-power constraint in the Lagrangian function given by equation (13). For a sufficiently large penalty, the inner maximization of this Lagrangian function would result in the max-power constraint of user k being satisfied. The job of the outer minimization is to find the smallest penalty so that all constraints are satisfied.

From hereon, we refer to $\lambda_k$ as the "max-power penalty" for each user $k\epsilon[1,K]$, and $\mu_k$ as the "target-rate penalty" for each user $k\epsilon FM$.

The solution to the dual problem can be found by first fixing $\lambda$ and $\mu$, then solving the inner maximization for all users' PSDs, corresponding to the entries of the matrix P. The inner maximization is concave and thus has a unique solution over the PSD mask constraint set $\{P_k^n : 0 \leq P_k^n \leq PSD_k^n\}_{k=1}^K$. We can easily find this unique maximizer by finding the stationary point of the Lagrangian function given in equation (13).

For users in the RA set, the stationary point occurs when powers within the PSD mask that satisfy the following equation:

$$\frac{\partial L_s}{\partial \tilde{P}_{k\in RA}^n} = 0 = \omega_k \alpha_k^n - P_k^n \left( \lambda_k + \sum_{\substack{j \neq k \\ j \in RA}} \omega_j \alpha_j^n \frac{SIR_j^n(\mathbb{P}^n)}{G_{jj}^n P_j^n} G_{jk}^n + \sum_{j \in FM} \mu_j \alpha_j^n \frac{SIR_j^n(\mathbb{P}^n)}{G_{jj}^n P_j^n} G_{jk}^n \right).$$

Similarly, for users in the FM set, the stationary point occurs when powers within the PSD mask satisfy the following equation:

$$\frac{\partial L_s}{\partial \tilde{P}_{k\in FM}^n} = 0 = \mu_k \alpha_k^n - P_k^n \left( I_{\{RA=\emptyset\}} + \lambda_k + \sum_{j \in RA} \omega_j \alpha_j^n \frac{SIR_j^n(\mathbb{P}^n)}{G_{jj}^n P_j^n} G_{jk}^n + \sum_{\substack{j \neq k \\ j \in FM}} \mu_j \alpha_j^n \frac{SIR_j^n(\mathbb{P}^n)}{G_{jj}^n P_j^n} G_{jk}^n \right).$$

In both of these expressions, we have transformed the partial derivative back to the P-space using the relation $P_k^n = \exp(\tilde{P}_k^n)$.

We can form the following fixed-point equations from the above conditions to update the PSD of each user in an iterative fashion:

$$P_{k\in RA}^n = \min\left\{ PSD_k^n, \frac{\omega_k \alpha_k^n}{\lambda_k + \sum_{\substack{j \neq k \\ j \in RA}} \omega_j \alpha_j^n \frac{SIR_j^n(\mathbb{P}^n)}{G_{jj}^n P_j^n} G_{jk}^n + \sum_{j \in FM} \mu_j \alpha_j^n \frac{SIR_j^n(\mathbb{P}^n)}{G_{jj}^n P_j^n} G_{jk}^n} \right\}, \quad \text{Eq. (15)}$$

for RA users, and $$P_{k\in FM}^n = \min\left\{ PSD_k^n, \frac{\mu_k \alpha_k^n}{I_{\{RA=\emptyset\}} + \lambda_k + \sum_{j \in RA} \omega_j \alpha_j^n \frac{SIR_j^n(\mathbb{P}^n)}{G_{jj}^n P_j^n} G_{jk}^n + \sum_{\substack{j \neq k \\ j \in FM}} \mu_j \alpha_j^n \frac{SIR_j^n(\mathbb{P}^n)}{G_{jj}^n P_j^n} G_{jk}^n} \right\}, \quad \text{Eq. (16)}$$

for FM users.

These are fixed-point equations because $P_k^n$ also appears in the denominator of each SIR term. Powers that would otherwise exceed the PSD mask are clipped to their maximum value. We need not check for negative power allocations, because all quantities within the brackets are positive.

When users' powers are updated iteratively with equations (15) and (16), convergence to the stationary point is easily proved by showing that the right-hand side of equation (15) and (16) are standard interference functions. It then follows that these iterative updates solve the inner maximization of equation (14).

Moving to the outer minimization, we may update the max-power penalty $\lambda_k$ through an iterative gradient descent $$\lambda_k^{(s+1)} = \left[ \lambda_k^{(s)} + \varepsilon_\lambda \left( \sum_n P_k^{n(s)} - P_k^{max} \right) \right]^+, \quad \text{Eq. (17)}$$

where $[\bullet]^+ = \max(0, \bullet)$, the constant $\varepsilon_\lambda$ is a sufficiently small step-size and s is an iteration number for the subproblem. Each $\lambda_k$ is updated locally by each user k using only local information.

Similarly, we may update target-rate penalty $\mu_k$ through an iterative gradient descent $$\mu_{k\in FM}^{(s+1)} = \left[ \mu_{k\in FM}^{(s)} + \varepsilon_\mu \left( R_k^{target} - \sum_{n=1}^N [\alpha_k^n \log(SIR_k^n(\mathbb{P}^n)) + \beta_k^n] \right) \right]^+, \quad \text{Eq. (18)}$$

where the constant $\varepsilon_\mu$ is a sufficiently small step-size. Each $\mu_k$ is updated locally by each user $k\epsilon FM$ using only local information.

In practice, we need not find the inner maximizer of the dual problem before moving to the outer minimization updates above. A single ascent step is sufficient, that equates to a single iteration of equations (15) and (16). Going further, one or more outer iterations of equation (17) also appear to be sufficient in practice, before the tightening step in the above procedure (step 3b): each subproblem need not be solved in full, as outlined above.

These power updates have an elegant intuitive interpretation: the $G_{jk}^n$ terms indicate the impact user k has on all other users j, tone n. Power is allocated in such a way so that it takes other users into account, rather than a simple selfish allocation as is done in IWF. Furthermore, should the power constraint of user k be violated, the max-power penalty $\lambda_k$ is increased, lowering the power to a level within the power budget.

We recall that the scalarization weights $\omega_k$ allow the system-operator to give preference or priorities to different users.

Comparing equations (15) and (16), we have observed that the Lagrange dual variables $\mu_k$ appear to be doing exactly the same thing: they give a certain weight to the power allocation of user k∈FM, except here the weight will be automatically tuned by iteration such that the user's minimum required rate $R_k^{target}$ has been reached exactly. In contrast, the scalarization weights $\omega_k$ are typically fixed by the system operator once chosen, as outlined earlier, and do not relate to a specific target-rate.

Using this observation, we may simplify the current notation and unify the PSD update equations (15) and (16). Denote by $\delta_k$ a "QoS parameter" for user k defined by $$\delta_k = \begin{cases} \omega_k, & k \in RA \\ \mu_k, & k \in FM \end{cases} \quad \text{Eq. (19)}$$

Essentially, this QoS parameter allows us to differentiate users with uniform notation and this further simplifies the implementation of the invention as a result.

The PSD equations (15) and (16) are now captured in the following unified update:

$$P_k^n = \min\left\{PSD_k^n, \frac{\delta_k \alpha_k^n}{I_{\{k \in FM \atop RA=0\}} + \lambda_k + \sum_{j \neq k} \delta_j \alpha_j^n \frac{SIR_j^n(\mathbb{P}^n)}{G_{jj}^n P_j^n} G_{jk}^n}\right\} \quad \text{Eq. (20)}$$

where the function $I_A$ is an indicator of the specified event A.

While the gradient-descent based updates given by equations (17) and (18) will lead to the optimum $\lambda^*$ and $\mu^*$ that solve the dual problem, it may be slow to converge in practice and even exhibit oscillations prior to convergence. In the preferred embodiment, bisection is employed to update each component of the max-power penalty vector $\lambda$ independently, although a person skilled in the art may use other well-known techniques, for example an ellipsoid method, to achieve a similar goal.

We now describe a novel closed-form update of the target-rate penalty variables $\delta_{k \in FM}$ resulting in a very fast convergence rate. We make use of the fact that the rate-target constraints are always met with equality at the optimal solution to the problem given by equation (12).

Re-arrange the constraint as follows:

$$R_k^{target} = \sum_{n=1}^{N} \alpha_k^n \log(SIR_k^n(\mathbb{P}^n)) + \beta_k^n \quad \text{(Eq. 21)}$$

$$= \sum_{n=1}^{N} \alpha_k^n \left[\log\left(\frac{SIR_k^n(\mathbb{P}^n)}{\delta_k}\right) + \log(\delta_k)\right] + \beta_k^n$$

$$\delta_k = \exp\left\{\frac{R_k^{target} - \left[\sum_{n=1}^{N} \alpha_k^n \log\left(\frac{SIR_k^n(\mathbb{P}^n)}{\delta_k}\right) + \beta_k^n\right]}{\sum_{n=1}^{N} \alpha_k^n}\right\}, k \in FM$$

The resulting expression for $\delta_{k \in FM}$ depends only on the constants $R_k^{target}$, $\alpha_k^n$ and $\beta_k^n$. It does not directly depend on $\delta_k$ since the SIR is directly proportional to $\delta_k$ and we have divided it out.

We now outline how the SCALE algorithm may be made distributed through a combination of local measurement and message-passing with a SMC coordinator.

Re-write the PSD update equation (20) as $$P_k^n = \min\left\{PSD_k^n, \frac{\delta_k \alpha_k^n}{\lambda_k + M_k^{n(s)}}\right\} \quad \text{Eq. (22)}$$

where $M_k^{n(s)}$ is a non-negative floating-point number, passed as a message to user k from the SMC, defined as $$M_k^{n(s)} = I_{\{k \in FM \atop RA=0\}} + \sum_{j=1 \atop j \neq k}^{K} G_{jk}^n N_j^{n(s+1)}, \quad \text{Eq. (23)}$$

and formed by a weighted sum calculation at the SMC, where we assume access to estimates of the crosstalk gains $G_{jk}^n$ are available. The crosstalk gains may be obtained from a measurement process, or with the aid of standard crosstalk models that are known in the art, and knowledge of the loop topology.

The terms $N_j^{n(s)}$ are also non-negative floating point messages from every other user j≠k on tone n to the SMC, $$N_j^{n(s)} = \delta_j \alpha_j^n \frac{SIR_j^n(\mathbb{P}^n)}{G_{jj}^n P_j^n} = \frac{\delta_j \alpha_j^n}{\sum_{i \neq j} G_{ji}^n P_i^n + \sigma_j^n} = \frac{\delta_j \alpha_j^n}{\tilde{\sigma}_k^n(\mathbb{P}^n)}$$

and is a local quantity at the receiver of user j: a simple scaled noise measurement on tone n.

The assumption of continuous bit-loading underlay the proceeding development. That is, once the PSD $P_k$ of user k is found with the SCALE algorithm, the bit-loading (in bits/channel use) on each tone is computed with $$b_k^n = \log_2(1 + SIR_k^n(\mathbb{P}^n)) = \log_2\left(1 + \frac{G_{kk}^n P_k^n}{\tilde{\sigma}_k^n(\mathbb{P}^n)}\right).$$

In practice, it may be desirable to limit the bit-loading to a discrete set. This may be achieved by "layering" the PSD optimization and bit-loading operations: first all user PSDs are optimized as per the SCALE algorithm; the resulting continuous bit-loadings are then mapped to the desired discrete set as a secondary operation.

For example, the discrete set of integers $b_k^n \in [0, b_{max}^n]$, may be desirable in practice, where $b_{max}^n$ is some maximum integer bit-loading on tone n and a bit-loading of zero indicates that the associated tone will not used for data communication. The continuous to discrete mapping may be implemented with $$b_k^n = \min\left[b_{max}, \log_2\left(1 + \frac{G_{kk}^n P_k^n}{\tilde{\sigma}_k^n(\mathbb{P}^n)}\right)\right],$$

given the PSD $P_k$ of user k. A further example may be non-integer discrete loadings, where a simple mapping is the rounding down to the nearest discrete level.

While this layered approach may not be optimal, it nevertheless provides a simple and practical way in which to operate with discrete bit-loadings.

We now show that when the SMC messages $M_k^n$ are discarded, then the method above reduces to the same performance as IWF. That is, when the co-ordination of the SMC is removed from the system so that PSD updates are totally decoupled and autonomous, then the SCALE algorithm outlined above gives the same performance level as IWF.

The following development also gives rise to a new and more efficient PSD update scheme when full autonomy is required and the SMC messages $M_k^n$ are not utilized. We call the approach Successive Convex Approximation for Iterative Waterfilling (SCAWF).

The general IWF methodology attempts to solve the optimization problem given by equation (9) by splitting it into a sequence of $k \in [1,K]$ subproblems. Each subproblem treats the crosstalk from other users as fixed background noise, rather than explicitly and jointly optimizing over all user PSDs together as outlined above.

First consider a user $k \in RA$. This user solves the following subproblem for their PSD $P_k$ with crosstalk interference from all other users assumed fixed:

$$\max_{0 \le P_k \le PSD_k} \delta_k \sum_{n=1}^{N} \log(1 + SIR_k^n(\mathbb{P}^n)) \qquad \text{Eq. (24)}$$

$$\text{s.t.} \sum_{n=1}^{N} P_k^n \le P_k^{max},$$

and where we have also substituted $\delta_k \equiv \omega_k$ for consistency with developments above.

This is a standard concave maximization problem in the vector $P_k$. We can apply the same lower-bound technique, resulting in the following relaxed problem with fixed constants $\{\alpha_k^n, \beta_k^n\}_{n=1}^{N}$:

$$\max_{0 \le P_k \le PSD_k} \delta_k \sum_{n=1}^{N} [\alpha_k^n \log(SIR_k^n(\mathbb{P}^n)) + \beta_k^n] \qquad \text{Eq. (25)}$$

$$\text{s.t.} \sum_{n=1}^{N} P_k^n \le P_k^{max}.$$

Solving this relaxation for fixed $\{\alpha_k^n, \beta_k^n\}_{n=1}^{N}$, then tightening according to equation (10) and repeating until convergence will result in a PSD $P_k$ that satisfies the KKT conditions of the original concave maximization given by equation (24). The converged PSD must then be optimal.

The solution to the relaxed RA problem given by equation (25) is found by forming an appropriate Lagrangian dual optimization having a single max-power penalty variable $\lambda_k$. The resulting algorithm is written:

$$\lambda_k^{(s+1)} = \left[\lambda_k^{(s)} + \varepsilon\left(\sum_n P_k^{(s)} - P_k^{max}\right)\right]^+ \qquad \text{Eq. (26)}$$

$$P_k^{n(s+1)} = \min\left\{PSD_k^n, \frac{\delta_k \alpha_k^n}{\lambda_k^{(s)}}\right\}. \qquad \text{Eq. (27)}$$

Comparing this to the preceding development of SCALE, we immediately note that the max-power penalty update in equation (26) is identical to the SCALE update as given in equation (17). The power update (27) is also identical to the SCALE update given by equation (22) when we disregard the impact user k has on other users (i.e. all SMC messages $M_{k \in RA}^n = 0$).

We can repeat this process for the FM problem, given by $$\max_{0 \le P_k \le PSD_k} -\sum_{n=1}^{N} P_k^n \qquad \text{Eq. (28)}$$

$$R_k^{target} \le \sum_{n=1}^{N} \log(1 + SIR_k^n(\mathbb{P}^n))$$

s.t.

$$\sum_{n=1}^{N} P_k^n \le P_k^{max}.$$

The resulting FM relaxation is given by $$\max_{0 \le P_k \le PSD_k} -\sum_{n=1}^{N} P_k^n \qquad \text{Eq. (29)}$$

$$R_k^{target} \le \sum_{n=1}^{N} [\alpha_k^n \log(SIR_k^n(\mathbb{P}^n)) + \beta_k^n]$$

s.t.

$$\sum_{n=1}^{N} P_k^n \le P_k^{max}.$$

To solve the relaxation, we form the Lagrangian dual, having a single max-power penalty variable $\lambda_k$, and a rate-target penalty variable $\delta_k \equiv \mu_k$. The resulting algorithm is:

$$\lambda_k^{(s+1)} = \left[\lambda_k^{(s)} + \varepsilon\left(\sum_n P_k^{(s)} - P_k^{max}\right)\right]^+ \qquad \text{Eq. (30)}$$

$$\delta_k = \exp\left\{\frac{R_k^{target} - \left[\sum_{n=1}^{N} \alpha_k^n \log\left(\frac{SIR_k^n(\mathbb{P}^n)}{\delta_k}\right) + \beta_k^n\right]}{\sum_{n=1}^{N} \alpha_k^n}\right\} \qquad \text{Eq. (31)}$$

$$P_k^{n(s+1)} = \min\left\{PSD_k^n, \frac{\delta_k \alpha_k^n}{1 + \lambda_k^{(s)}}\right\} \qquad \text{Eq. (32)}$$

The penalty updates given by equations (30) and (31) are the same as the SCALE algorithm, equations (17) and (21) respectively. The power update is the same as SCALE when the SMC messages $M_{k \delta FM}^n = 1$. This results from the problem set up given in equation (28), where it is assumed that the indicator function in equation (23) is always fixed to one.

We therefore conclude that SCALE degrades in performance to the same level as IWF when no message-passing is available, or desired, and more importantly, it motivates the possible use of reduced communication to form a hybrid SCALE-IWF scheme whereby no communication is used on tones enjoying little or no FEXT (i.e. those at low frequencies), and making full use of neighboring line conditions on tones heavily affected by FEXT to improve performance beyond IWF. As the amount of communication reduces to zero, SCALE degrades gracefully in performance to the same level as what IWF would provide.

The convergence speed of these water-filling algorithms given by equations (26) to (27) are vastly improved by avoiding the gradient descent on the max-power penalty $\lambda_k$. Such a method is now described.

First consider the RA problem, and its relaxation given by equation (25). Denote by $P_k^*$ the optimal solution to this relaxation, for the selected values of $\alpha_k^n$ and $\beta_k^n$. Further define the set $CLP_k = \{n: P_k^{n*} > PSD_k^n\}$, containing the indices of all tones that are clipped to the PSD mask at the optimal solution. It is easy verified that the optimal solution the will make full use of the maximum power $P_k^{max}$ available. Therefore, the optimal power allocation must satisfy $$\sum_{m=1}^{N} P_k^{m*} = P_k^{max}$$

and this condition is equivalent to $$\sum_{m \notin CLP_k} \frac{\delta_k \alpha_k^m}{\lambda_k^*} + \sum_{m \in CLP_k} PSD_k^n = P_k^{max}, \qquad \text{Eq. (33)}$$

following directly from equation (27).

Solving this relaxed RA problem amounts to finding the optimal max-power penalty $\lambda_k^*$ and the set $CLP_k$. Note that if the set $CLP_k$ was known, the optimal max-power penalty is found in closed-form:

$$\lambda_k^* = \frac{\delta_k \sum_{m \notin CLP_k} \alpha_k^m}{P_k^{max} - \sum_{m \in CLP_k} PSD_k^n}. \qquad \text{Eq. (34)}$$

The optimal power allocation then follows $$P_k^{n*} = \begin{cases} PSD_k^n, & n \in CLP_k \\ \left(P_k^{max} - \sum_{m \in CLP_k} PSD_k^m\right) \frac{\alpha_k^n}{\sum_{m \notin CLP_k} \alpha_k^m}, & \text{otherwise,} \end{cases} \qquad \text{Eq. (35)}$$

where the second case comes from substituting equation (34) into equation (27).

We will make use of this condition to find the set $CLP_k$ using an iterative method: starting with $CLP_k = \emptyset$, we evaluate equation (35) to find a power-allocation. Should any of the resulting powers exceed their respective PSD constraint, the associated tone indices are added to the set $CLP_k$ and the current PSD is not yet optimal. This process is repeated until none of the allocated powers exceed the PSD mask; the condition given by equation (35) is then satisfied and the resulting power-allocation $P_k$ is indeed optimal.

Now consider the FM problem and its relaxation given by equation (29). We want to avoid the update of the max-power penalty given by equation (30), and the associated value embedded in equation (32). At the optimal solution to the relaxation, we know that the maximum power constraint must not be exceeded. In such a case, we propose that such intermediate infeasible iterates before convergence are simply projected back into the feasible set. This results in the following procedure that is repeated until convergence:

1. Calculate the QoS parameter with equation (31);
2. With $\lambda_k^{(s)} = 0$, calculate the PSD over all tones n=1,K,N with equation (32);
3. Compute the Required Power $$P_k^{req} = \sum_{m=1}^{N} P_k^{m(s+1)}. \qquad \text{Eq. (36)}$$

4. If the required power exceeds the maximum user-power, i.e. $P_k^{req} > P_k^{max}$, then the maximum power constraint is violated. In that case, project the PSD back into the feasible set:

$$P_k^{n(s+1)} = \frac{P_k^{max}}{P_k^{req}} P_k^{n(s+1)} \qquad \text{Eq. (37)}$$

The SCAWF algorithms present a particularly attractive alternative to the current IWF algorithms that are known in the art. Known algorithms prior to this invention compute a full conventional water-filling solution for every user at each iterate. Such an approach requires expensive computation at each step, whereas the SCAWF algorithms compute an approximate solution at each iteration that adapts each users' power together until the simultaneous multi-user water-filling solution is met exactly. The SCAWF algorithms are also extremely simple. No channel sorting or complex data-structures are required.

Exemplary Implementation

The implementation of a preferred embodiment of the invention will now be described in detail. Specifically, the implementation of the preferred embodiment of this invention will be described by way of example in connection with the downstream portion of a DSL system such as the one pictured in FIG. 1. In this example, there are M=2 user-groups: the first user-group is connected to a RT and the second with a CO. As mentioned above, a typical DSL system may have thousands of COs and RTs, with millions of subscribers. Those skilled in the art having reference to this specification and its drawings will be readily able to adapt this preferred embodiment of the invention to a larger sized system by either partitioning it into independent systems as specified previously, and/or by a simple extension of the following implementation detail.

Figure 5:
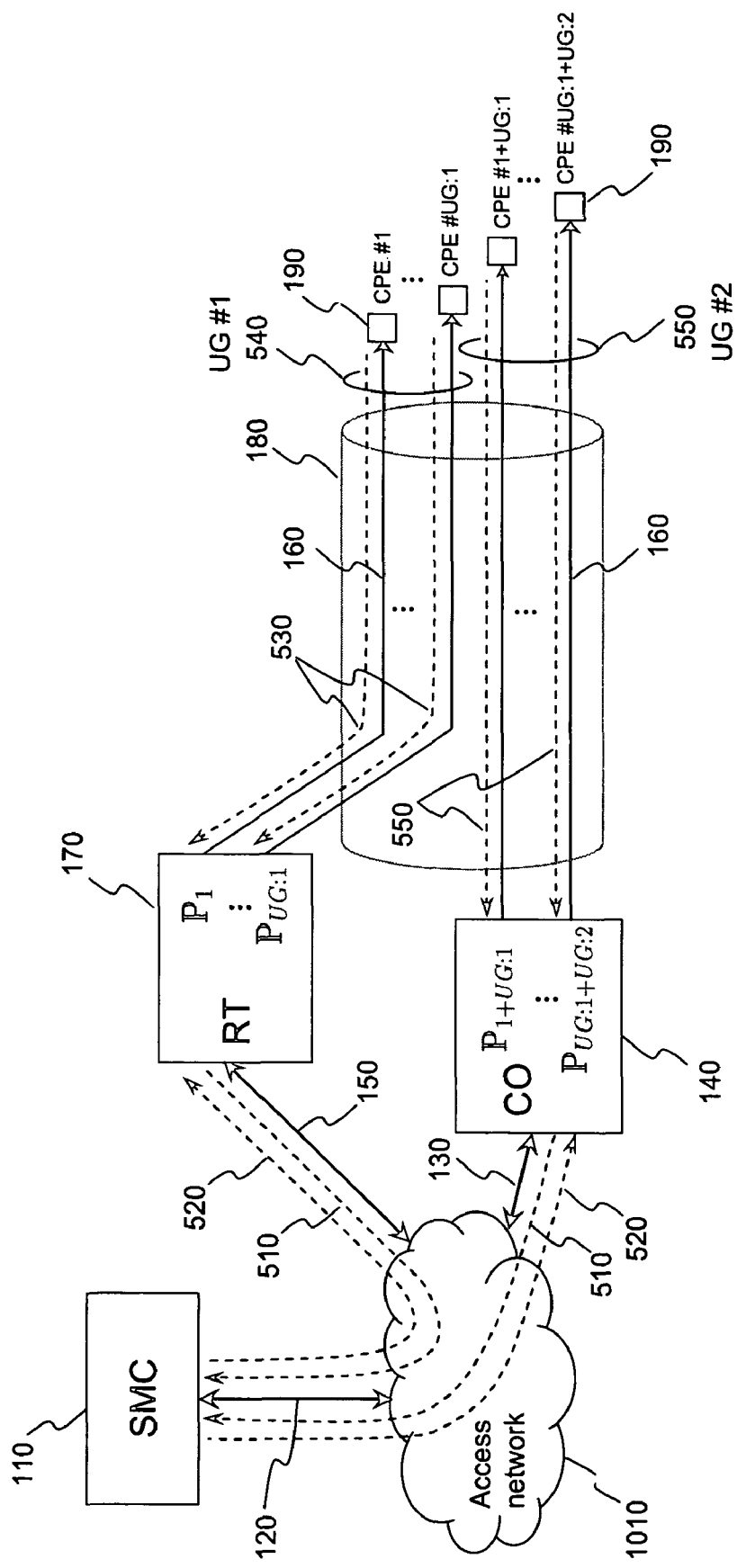
FIG. 5 is a schematic diagram depicting the flow of communication between entities within the preferred embodiment of the invention, relating to the downstream of a DSL system by way of example.

The example is illustrated in FIG. 5, where user-group 540 comprises UG:1 subscribers and the second user-group 550 comprises UG:2 subscribers. Accordingly, there are K=UG: 1+UG:2 subscribers in total. The CPE 190 in the second group 550 are connected to the CO 140 with separate twisted-pair wire conductors 160. The CO 140 is establishing a DSL communication session with each of the CPE in the second group 550. Similarly, the CPE 190 in the first group 540 are each connected to the RT 170, also with separate twisted-pair wire conductors 160. As shown in FIG. 5, all twisted-pairs are contained within a binder 180 at least some distance along their length. The RT 170 is also establishing a DSL communication session with each of the CPE in the first group 540. As described above, each communication session is bidirectional; however this description will concentrate on the downstream direction (CO 140 to CPE 190, and RT 170 to CPE 190) to remain as simple as possible. Those skilled in the art having reference to this specification and its drawings will be able to extend this detailed description in a straightforward way to produce a system capable of bidirectional communication.

As described above, each of the CPE 190, CO 140 and RT 170 are constructed as, or include, a DSL modem that employs DMT modulation with up to N tones. In this example, the RT 170 is a field-installed remote terminal such as an ONU or remote DSLAM, and is substantially closer to all CPE 190, than is the CO 140. Such a RT 170 may be considered as a neighborhood ONU or DSLAM that is situated closer to subscriber premises than the CO 140.

The CO 140 and RT 170 are each connected to the SMC 110 via a high-speed access network 1010. The connection of the access network 1010 to a WAN, as illustrated in FIG. 1, is not shown in FIG. 5 for simplicity of exposition.

For the purposes of spectrum balancing, each modem at the LT end associated with a specific user k∈[1,K] includes a "user requirements" database that includes values of: the maximum transmit power available $P_k^{max}$ to the modem for transmission over the N available DMT tones, a PSD mask $\{PSD_k^n : n=1,K,N\}$, and one of either a positive QoS weight $\omega_k$ or a positive minimum data-rate target $R_k^{target}$ (as described in the Theory of Operation), but not both. In what follows, each user k is deemed as being rate-adaptive (RA) if their QoS weight is non-zero, otherwise the user is deemed as having a fixed-margin (FM). These classifications respectively correspond to users maximizing their data-rate on a relative scale to other RA users as determined by the relative QoS weights; and users who must meet a minimum data-rate target. According to this preferred embodiment, user requirements may be communicated to each LT modem during an initialization phase, from an entity in the network such as the CO 140, RT 170, SMC 110, or some other NMC, and stored, or pre-loaded, in a nonvolatile memory within the LT modems themselves. The preceding description should not preclude a situation whereby a particular RA user is reclassified as a FM user (or vice-versa) through an operational message that is passed to an LT-end modem by the SMC 110.

According to this preferred embodiment of the invention, the communication load between the SMC 110 and CO 140, as well as between the SMC 110 and RT 170 are relatively modest. The communication from the CO 140 and RT 170 to the SMC 110 involves a tone-by-tone weighted noise message vector 510, detailed further below. The SMC 110 combines such message vectors with network loop characteristics on a tone-by-tone basis, and sends a this as a new vector feedback message 520 back to the LT-end modems located in the CO 140 and RT 170 for the purpose of determining an optimized PSD. As shall be described in detail below, this process is an iterative one.

A top-level illustration of the spectrum balancing method is given in FIG. 4. It is contemplated that these operations will be formed during initialization of a DSL session between a subscriber's CPE 190, and their associated CO 140 or RT 170; any existing communications between other CPE 190 and associated CO 140 or RT 170 may be adjusted as a result, and/or adjusted in concert with other DSL sessions that are undertaking a similar initialization phase.

With reference to FIG. 4, each user shall implement the functionality of the five blocks B1 to B5 inclusive. For the purposes of the downstream system of the preferred embodiment, Block B1 410-*k* resides in the NT-end modem associated with user k, while blocks B2 420-*k*, B3 430-*k*, B4 440-*k*, and B5 450-*k* reside in the LT-end modem associated with user k. It is contemplated that communication between blocks residing in the physically separate NT- and LT-end modems is readily achieved during both of the initialization and steady-state stages of the DSL connection, using existing methods known in the art, for example, the use of the embedded operation channel (EOC) available during steady-state operation, as specified by the ADSL and VDSL standards. The detailed implementation of these blocks shall now be given with reference to a chosen user k∈[1,K], where such implementation can be undertaken, and preferably are undertaken, simultaneously and in parallel with all other users, considering that each operation involves only parameters that are known or can be established at each location.

The spectrum balancing method according to the preferred embodiment of the invention begins with Block B1 410-*k*, in which the loop characteristics are measured at the NT-end modem. These are communicated to the LT-end modem located at the CO 140 or RT 170. These loop characteristics involve per-tone signal to interference ratios (denoted by $\{SIR_k^n : n=1,K,N\}$) that have been normalized by an appropriate "SIR-gap" as described in the Theory of Operation, interference plus noise measurements made at the receiver 410-*k*, also on a tone-by-tone basis, denoted by $\{\tilde{\sigma}_k^n : n=1,K,N\}$ and direct channel transfer characteristics $\{G_{kk}^n : n=1,K,N\}$ that have also been normalized by an appropriate SIR-gap. Once obtained by the LT-end modem, these measurements are made available to blocks B2 420-*k* and B3 430-*k*.

Figure 6:
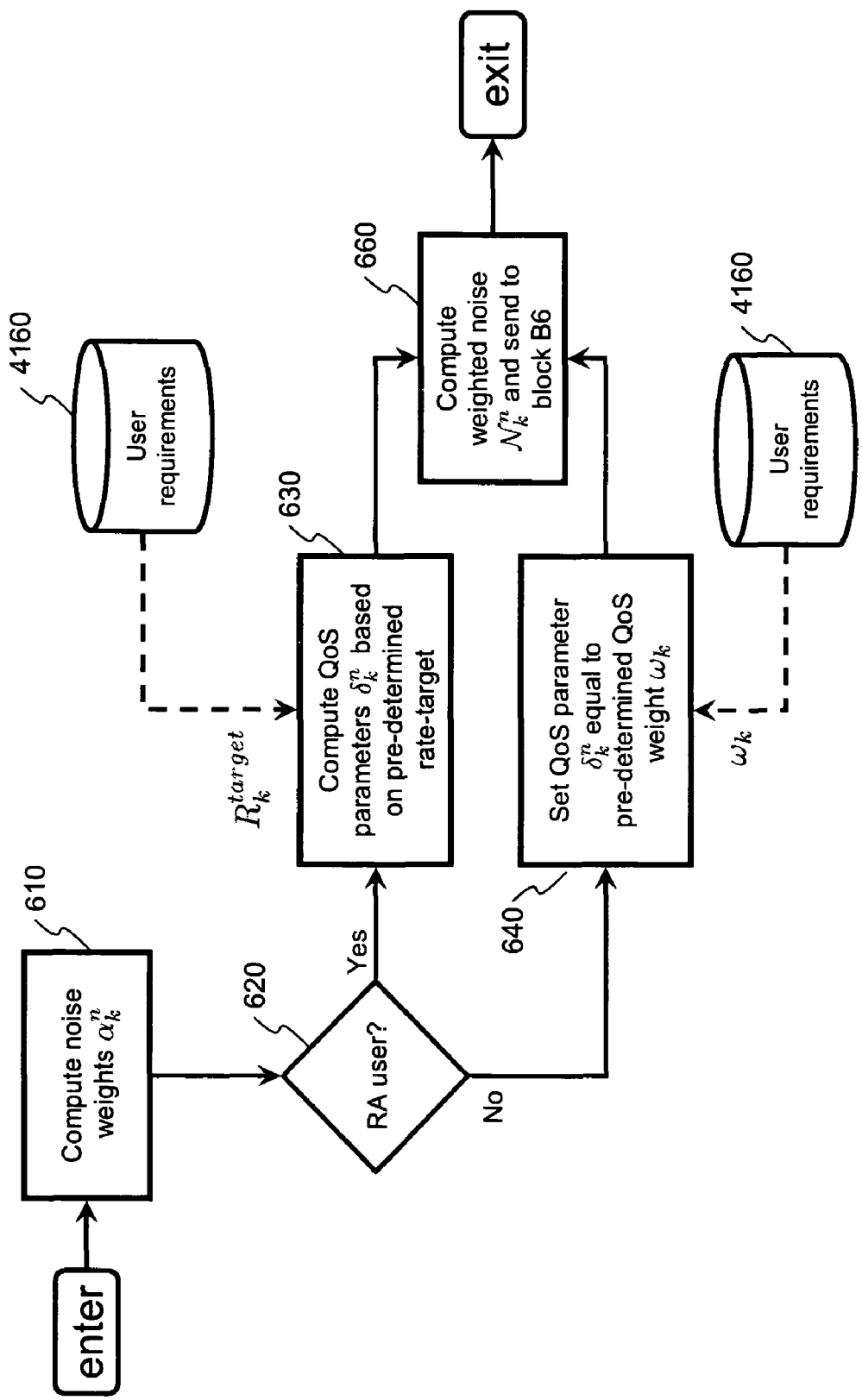
FIG. 6 is a flow diagram illustrating the operation of particularly Block B2 being the "Noise weight calculation" block depicted in FIG. 4, according to the preferred embodiment of the invention

Block B2 420-*k* at the LT-end modem combines the loop measurements with a QoS parameter, denoted by $\delta_k$. This process is illustrated in FIG. 6, and begins with process 610, where a noise weight is computed according to the equation $$\alpha_k^n = \frac{SIR_k^n}{1 + SIR_k^n}$$

for all tones n=1,K,N. This weight will be used in process 660.

A decision 620 is made, depending on whether user k is classified as RA or FM. An RA user proceeds to process 630, where the QoS parameter is updated according to the equation $$\delta_k = \exp\left\{ \frac{R_k^{target} - \left[\sum_{n=1}^{N} \log(1 + SIR_k^n) - \alpha_k^n \log(\delta_k)\right]}{\sum_{n=1}^{N} \alpha_k^n} \right\},$$

and where the minimum rate-target $R_k^{target}$ is obtained from the user requirements database 4160. As shown, the value of the QoS parameter depends on its previous value: the above update adapts the QoS parameter to ensure that the minimum rate-target $R_k^{target}$ of the user k is met. This process is iterative, as block B2 420-*k* is invoked repeatedly by virtue of the iterative nature of the present spectrum balancing method. The specific initial value of $\delta_k$ is not critical, as long as it is a strictly positive quantity. Control passes to process 660 after this update. Returning to decision 620, should the user k be classified as FM, control proceeds to process 640. The QoS parameter is set according to the equation $$\delta_k = \omega_k$$

where the QoS weight $\omega_k$ is obtained from the user requirements database 4160. Control passes to process 660 after this update.

Process 660 takes the noise weights and QoS parameters, and uses these to compute a weighted noise measurement according to the following equation $$N_k^n = \delta_k \alpha_k^n \tilde{\sigma}_k^n$$

for all tones n=1,K,N. These weighted noise measurements are collected into an N-length vector $$N_k = [N_k^1, N_k^2, K, N_k^N]$$

henceforth referred to as the "weighted noises" 4120 for a user k, and is sent to the SMC 110. As described above, this communication is effected through a high-speed network connection from the CO 140 or RT 170.

With reference to FIG. 4, the weighted noises from all users in the system 4120 are processed by block B6 4130 that resides in the SMC 110, as related to the preferred embodiment of the invention. The SMC aggregates these weighted noises, together with the crosstalk loop characteristics as illustrated in FIG. 7, before sending these aggregates to each user as feedback messages that are ultimately used to compute each user's PSD and bit-loading for the purpose of spectrum balancing.

Figure 7:
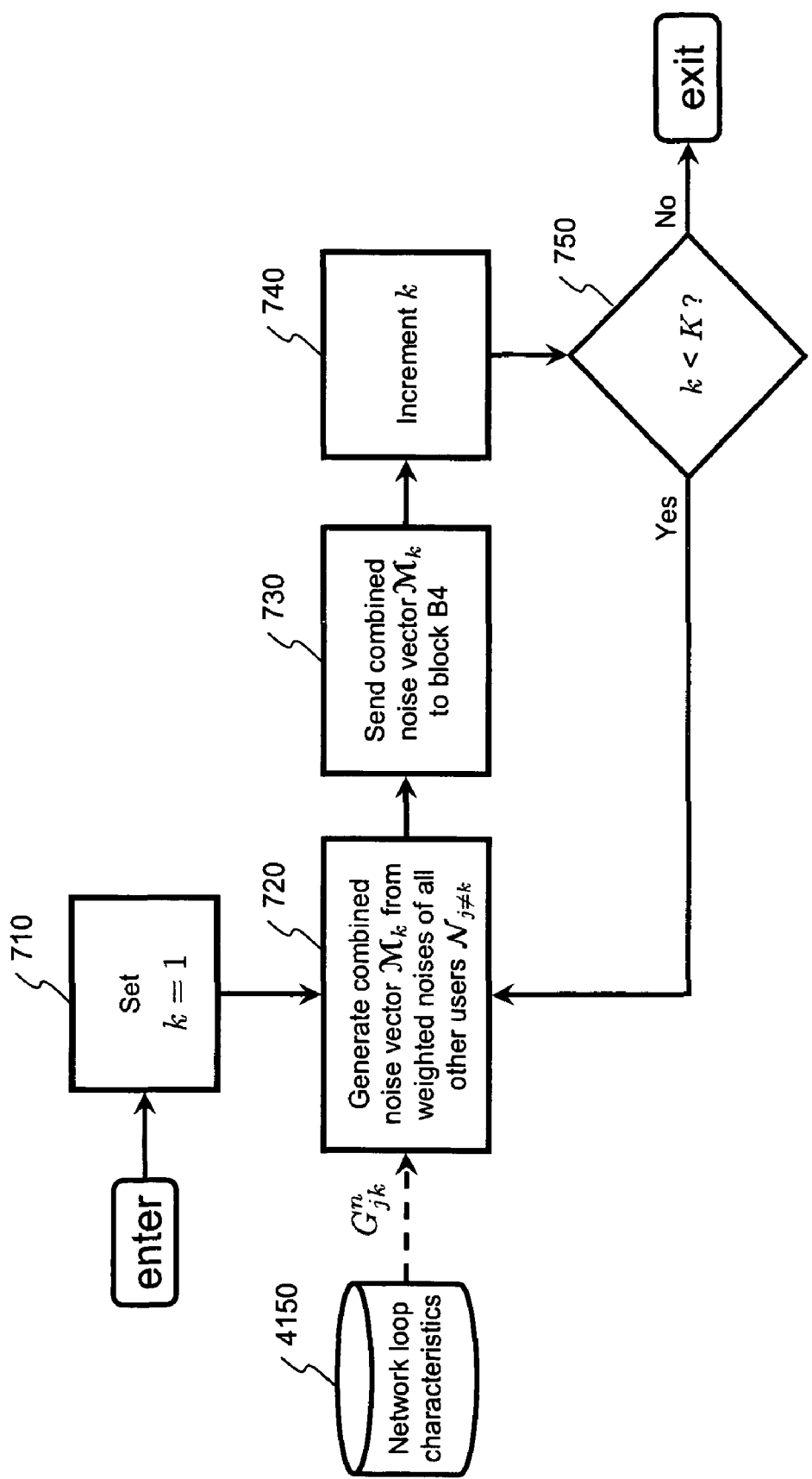
FIG. 7 is a flow diagram illustrating the operation of particularly Block B6 being the "Aggregate and combine weighted noises" block depicted in FIG. 4, according to the preferred embodiment of the invention.

The implementation of block B6 4130, with reference to FIG. 7, begins in process 710 by initializing a counter k that will effect an iteration over all users 1,K,K. For the "current user" k, the SMC combines the weighted noises $\{N_j^n : j \neq k\}$ in process 720. This weighted noise combination is performed on a tone-by-tone basis, according to the following formula $$M_k^n = I_k + \sum_{\substack{j=1 \\ j \neq k}}^{K} G_{jk}^n N_j^n,$$

where the value of $I_k$ is given by $$I_k = \begin{cases} 1, & \text{user } k \text{ is a FM user, and there are no RA users in the same binder} \\ 0, & \text{otherwise} \end{cases}$$

and where each crosstalk channel transfer gain $G_{jk}^n$ is obtained from a local database of network loop characteristics 4150. As described above, the crosstalk gains may be obtained from a measurement process, or with the aid of standard crosstalk models that are known in the art, and knowledge of the loop topology. It is contemplated that such knowledge of the loop topology would also be beneficial in determining the value of the indicator function $I_k$. Process 720 completes by collecting these per-tone weighted noise into the combined vectors $$M_k = [M_k^1, M_k^2, K, M_k^N],$$

henceforth referred to as the "combined noises" 4140 for a user k.

Process 730 sends the combined noises for the current user k to the respective block B4 440-k that resides in the NT-end modem of the user k. Control is then passed to process 740 that increments the counter k before checking, in the decision 750, whether to iterate the above procedure (from process 720 onward) for the next user in the system (decision 750 is YES), or whether to complete the implementation of block B6 4130 (decision 750 is NO).

Figure 8:
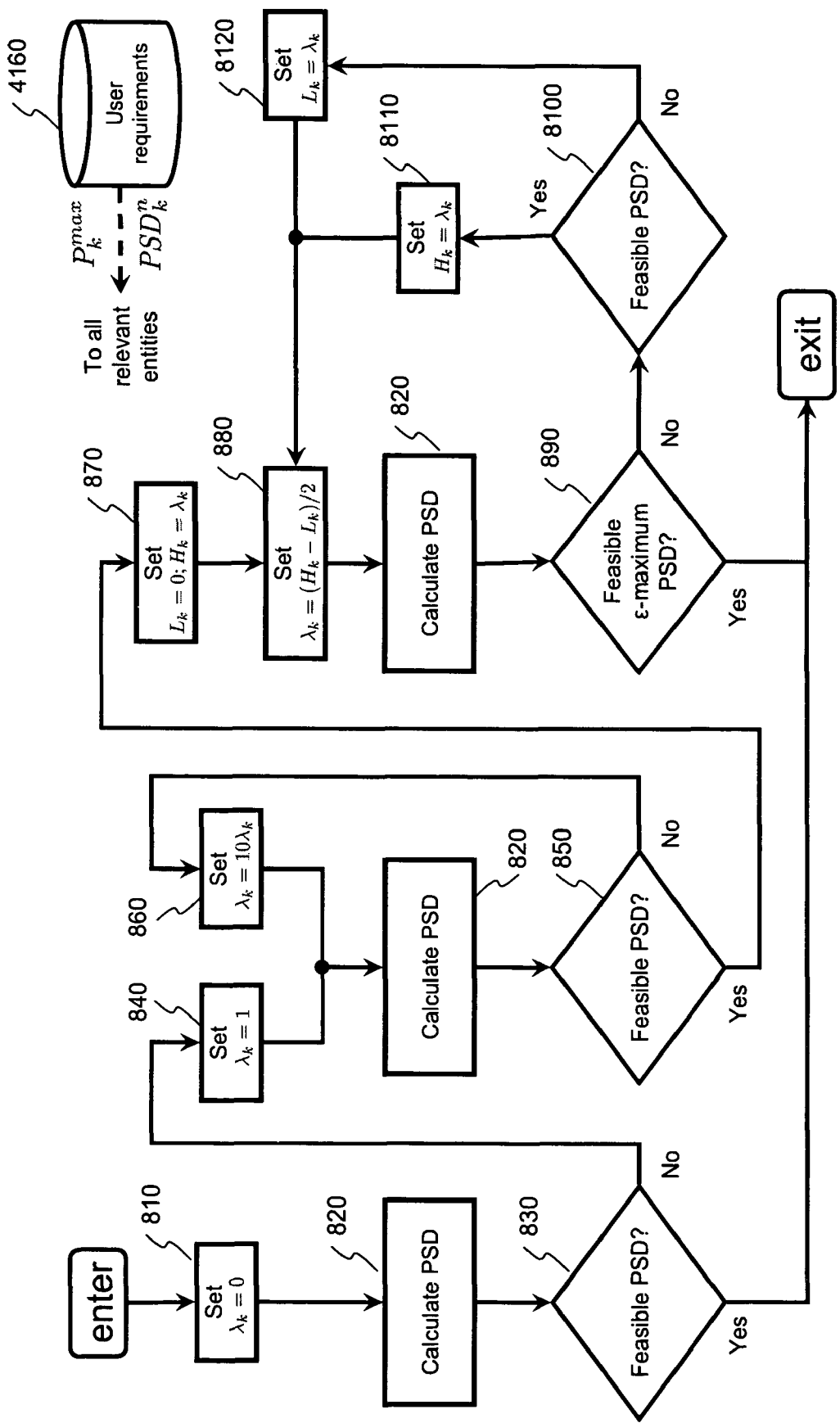
FIG. 8 is a flow diagram illustrating by way of example the operation of particularly Block B4 being the "PSD calculation" block depicted in FIG. 4, according to the preferred embodiment of the invention.

The NT-end modem of user k, once having obtained their combined noise 4140 from the SMC 110, passes this information to block B4 440-k for the purposes of updating the PSD of user k in conjunction with the noise weights and QoS parameter obtained from block B2 420-k, which is collocated in the same modem device as described above. An example of the technique for updating the PSD for implementing block B4 440-k, according to the preferred embodiment of the invention, is given in FIG. 8. The PSD update implementation can be summarized as a search for the smallest nonnegative value of the max-power penalty $\lambda_k$ that results in a "feasible PSD". A feasible PSD is one where the total sum of the transmit powers that comprise the PSD do not exceed the maximum power available, written as the mathematical inequality $$\sum_{n=1}^{N} P_k^n \leq P_k^{max}. \qquad \text{Eq. (38)}$$

Once the smallest max-power penalty is known, the resulting PSD is calculated based on the rule given by equation (22) from the Theory of Operation, repeated below $$P_k^n = \min\left\{PSD_k^n, \frac{\delta_k \alpha_k^n}{\lambda_k + M_k^n}\right\}. \qquad \text{[repeated] Eq. (22)}$$

Unfortunately the minimum value of the max-power penalty cannot be found in closed form, and a search must be performed. The following technique makes use of an iterative search once lower and upper bounds on the max-power penalty are determined. The search proceeds by iteratively subdividing the interval within which the minimum max-power penalty is known to reside, until a specified level of accuracy is obtained.

The max-power penalty search begins with process 810, where an initial guess is chosen as zero. Process 820 then calculates the PSD based on this value according to the rule given by equation (22) above. This calculation is undertaken over all n=1,K,N tones, and involves the noise weights $\alpha_k^n$ and QoS parameter $\delta_k$, both obtained from block B2 420-k, as well as the PSD mask from the user requirements database 4160 and the combined noises $M_k$ that were obtained from the SMC 110. Decision 830 then checks to see if the PSD is feasible. Should the updated PSD be feasible for a zero max-power penalty, then any increase in the penalty $\lambda_k$ will only reduce the PSD unnecessarily (and still remain feasible), so it is known that the minimum max-power penalty has been found: the implementation of block B4 440-k completes (decision 830 is YES).

Otherwise the PSD is infeasible (decision 830 is NO), and control is passed to process 840, where a search begins for an upper limit on the max-power penalty that ensures feasibility. In this case, it is further known that the minimum max-power penalty will occur when equation (38) is tight with equality. The aim therefore becomes to find a value of the max-power penalty which results in a PSD having sum-value equal to the maximum transmit power limit. In practice, a feasible PSD that has sum-value very close to the maximum limit is sufficient, and the following technique aims to find such as PSD within a small constant $\epsilon$ below the maximum. Equivalently, such a PSD would satisfy the "$\epsilon$-maximum condition", written as the mathematical inequality $$P_k^{max} - \varepsilon \le \sum_{n=1}^{N} P_k^n \le P_k^{max}. \qquad \text{Eq. (39)}$$

The upper limit search begins from $\lambda_k=1$ as set by process 840. The PSD is then updated with process 820, again according to equation (22) above, and a decision 850 tests for feasibility. If the max-power penalty is not large enough (decision 850 is NO), the candidate max-power penalty is increased further by a multiplicative factor of 10 in process 860, before repeating the above test. The initial and multiplicative factor for increasing the candidate max-power penalty are not critical, as the process is iterative in nature. After a sufficient number of iterations a large-enough max-power penalty candidate will be found to ensure feasibility and control is passed to process 870. In this process, the lower and upper limits on the minimum max-power penalty are initialized: the lower limit to zero, and the upper to the value resulting from the previous search (resulting from processes 840 to 860 inclusive). A candidate minimum max-power penalty is then chosen to be the center value between the lower and upper limits in process 880. The PSD is updated accordingly in process 820 and the candidate max-power penalty is tested for the $\epsilon$-maximum condition at decision 890. A PSD that is $\epsilon$-maximum completes the implementation of block B4 440-$k$ (decision 890 is YES). Otherwise, the PSD is subjected to the feasibility decision 8100. A PSD that feasible (decision 8100 is YES) but is not $\epsilon$-maximum (decision 890 is NO) implies that the associated candidate max-power penalty is too large, and so the minimal max-power penalty must lie below the current candidate. Process 8110 therefore sets the new upper limit to be the current candidate and the method repeats from process 880. On the other hand, a PSD that is not feasible (decision 8100 is NO), nor $\epsilon$-maximum (decision 890 is also NO), implies that the associated candidate max-power penalty is too small, and so the minimal max-power penalty must lie above the current candidate. Process 8120 therefore sets the new lower limit to be the current candidate and the method again repeats from process 880 until an $\epsilon$-maximum max-power penalty is found (decision 890 is YES), and whereby the associated PSD has been calculated.

It is contemplated that other alternative techniques for finding the max-power penalty and associated PSD may be apparent to those skilled in the art having reference to this specification and its drawings. One such alternative was described in the Theory of Operation involving the iteration of equations (17) and (22) until convergence with a fixed step size $\epsilon_\lambda$, although such an approach was found to converge much more slowly than the procedure described immediately above.

Figure 9:
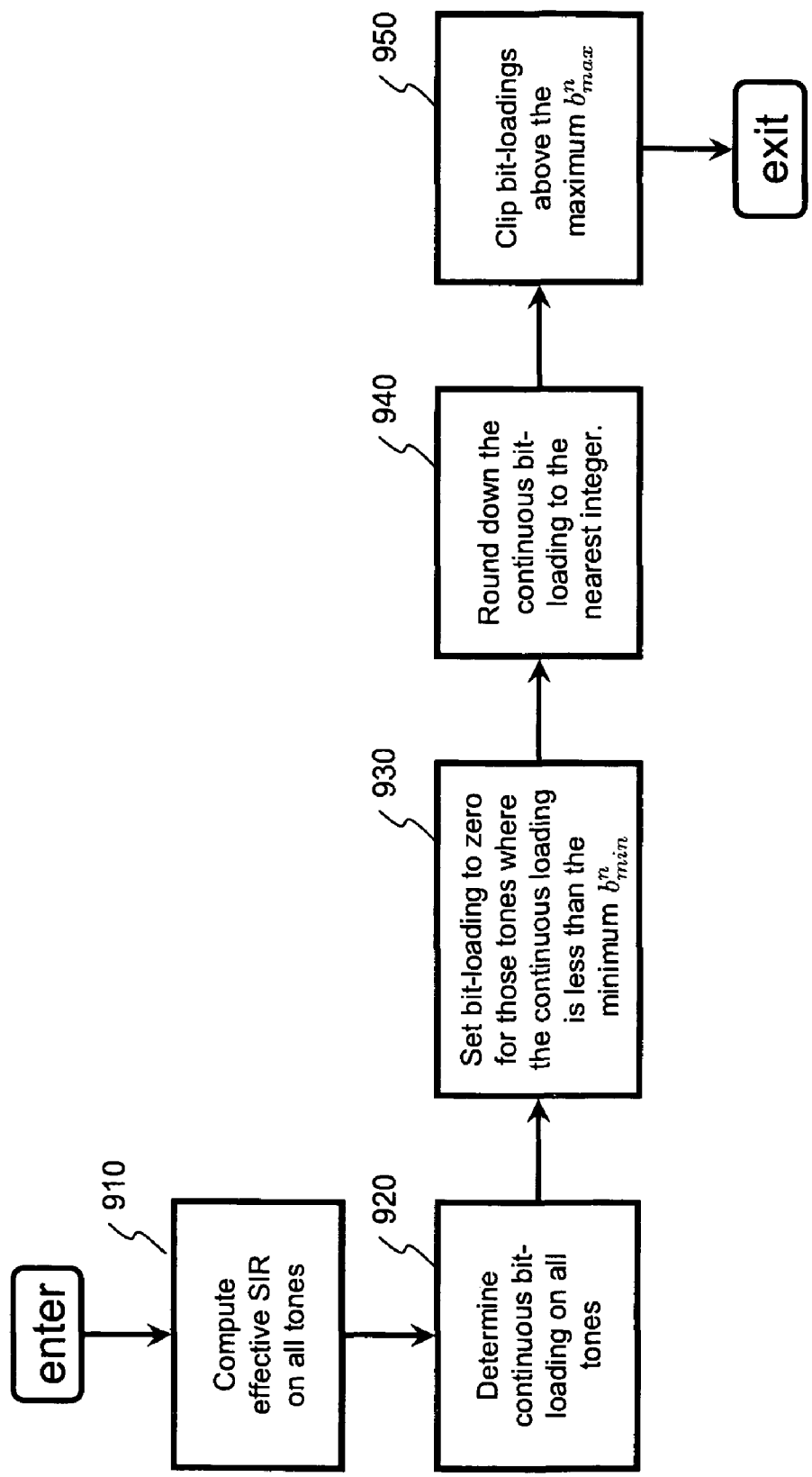
FIG. 9 is a flow diagram illustrating the operation of particularly Block B3 being the "Bit-loading mapping" block depicted in FIG. 4, according to the preferred embodiment of the invention.

Appealing again to FIG. 4, the calculated PSD of user k is then communicated to blocks B3 430-$k$ and B5 450-$k$. Block B3 430-$k$ computes an appropriate the bit-loading of DMT tones. With reference to FIG. 9, its detailed implementation is now described. Making use of the supplied PSD and measured loop characteristics that were passed from the NT-end receiver of block B1 410-$k$, an "effective SIR" (ESIR) is computed for all tones n by process 910, according to the relation $$ESIR_k^n = \frac{P_k^n G_{kk}^n}{\tilde{\sigma}_k^n}. \qquad \text{Eq. (40)}$$

Process 920 then maps these ESIR values to a continuous bit-loading value for each tone n, based on the Shannon formula that is well-known in the art, as given by $$b_k^n = \log_2(1 + ESIR_k^n)$$

These bit-loadings are passed to process 930, where those values below some minimum $b_{min}^n$ are set to zero, with the implication that such tones are not capable of transmitting data over the communications facility, and will not be used by the transmitter of block B5 450-$k$ shown in FIG. 4. In the preferred embodiment, this minimum threshold will take value $b_{min}^n=1$ in accordance with the minimum bit-loading specified in the VDSL standards, although other positive integer values may be substituted. The updated bit-loadings are then passed to process 940, where they are rounded down to the nearest integer. Process 950 then clips these integer bit-loadings to a maximum loading of $b_{max}^n$. In the preferred embodiment, this maximum threshold can take any specific value from $8 \le b_{max}^n \le 15$ as specified in the VDSL standards. It is contemplated that other alternative mappings from the ESIR values to per-tone bit-loadings and associated techniques will be apparent to those skilled in the art having reference to this specification. One such alternative is an extension to the integer loadings discussed above, where instead fractional bit-loadings are chosen from a discrete set.

Again returning to FIG. 4, the bit-loadings are then passed to block B5 450-$k$, along with the PSD determined in block B4 440-$k$ where these parameters can be set, or adjusted, to effect the DMT modulated signal transmission into the communications facility 160.

The entire process as described above then repeats, starting again with a new measurement of the line characteristics at block B1 410-$k$, until a steady-state PSD has been reached, at which time DSL communications over the communications facility 160 can commence (if the PSD optimization process occurred during initialization), or continue (if the PSD optimization process was performed during DSL an existing session).

Other Embodiments

An extension to the preferred embodiment of the present invention is now described, that features a reduction of the communication requirements between LT-end DSL modems (associated with the CO 140 or RT 170) and the SMC 110, as pictured in the exemplary network of FIG. 5. The preferred embodiment, with reference to FIG. 4, communicates messages from block B2 420-$k$ residing in the LT-end DSL modem, to block B6 4130 residing in the SMC 110. Return messages are sent from block B6 4130 (at the SMC 110), back to the LT-end DSL modem for input to block B4 440-$k$. These communications involve message vectors of length N from all users k=1,K,K. It has been observed according to this invention, that components of these vector messages do not make a significant impact on the calculated PSD (resulting from the implementation of block B4 440-$k$) when the level of mutual crosstalk coupling, relating to such components, is very low. This is typically the case for DMT tones located at the lower frequencies in a typical DSL system, where the electromagnetic coupling of the twisted pair loops is relatively very weak. Accordingly, this extension of the preferred embodiment involves omitting such components from the N-length message vectors to effect a reduction in the subsequent communication requirements. Determination of what subset of the N-length vector to omit, for example, is made by an "off-line" study that considers typical DSL loop topologies, resulting in a selection that may be statically programmed into the user requirements databases 4160, or by an "on-line" procedure whereby the SMC 110, having knowledge of the loop topology and crosstalk characteristics, instructs DSL modems 4110 of an appropriate subset.

It is further contemplated that any such messages sent from block B2 420-$k$ to block B6 4130 of the SMC 110, and correspondingly, those messages returning from block B6 4130 to block B4 440-$k$ of the LT-end DSL modem, may be compressed by techniques or methods known to a person skilled in the art having reference to this specification and its drawings. Examples of such compression should include those in which portions of the intended information is lost without significant performance impairment (for example, a quantization of the message vectors), or those in which an exact reproduction of the message is transferred (for example, by way of Huffman coding). One further example may involve a form of "lossy" compression whereby tones are grouped into clusters, and a common value (for example, the average of each cluster member) is communicated on behalf of all cluster members.

A further embodiment of the present invention considers a network such as the one pictured in FIG. 5, where now only a subset of LT-end DSL modems interact with the SMC 110. All other LT-end DSL modems do not interact with the SMC 110 in any way, shape or form. Going further, should the subset of modems that are "not communicative" with the SMC 110 correspond to all K users in the system, then the SMC 110 becomes redundant and may be completely omitted from the DSL communications system altogether. Of course, such an embodiment can be considered as a special-case of the extension to the preferred embodiment, described immediately above, where the entire N-length vector is omitted from any SMC-related communications, for those uncommunicative users. However, such a classification of this new embodiment would preclude a more efficient implementation as next described in detail.

For the purposes of this additional embodiment, those users whose LT-end modems remain communicative with the SMC 110 are identified: their implementation remains the same as described in the preferred embodiment of the invention. The implementation of the SMC 110 also remains the same whenever it exists within the system, except that, with reference to FIG. 4, block B6 4130 now combines weighted noises only from those users that are communicative, as identified above. Correspondingly, feedback messages are only sent to communicative users. For uncommunicative users, the implementation of block B2 420-$k$ remains the same as the preferred embodiment except that, with reference to FIGS. 4 and 6, block B2 420-$k$ no-longer sends weighted noise measurements to the SMC 110 in process 660 and the implementation of block B4 440-$k$ is replaced with the process flow illustrated in FIG. 10.

Figure 10:
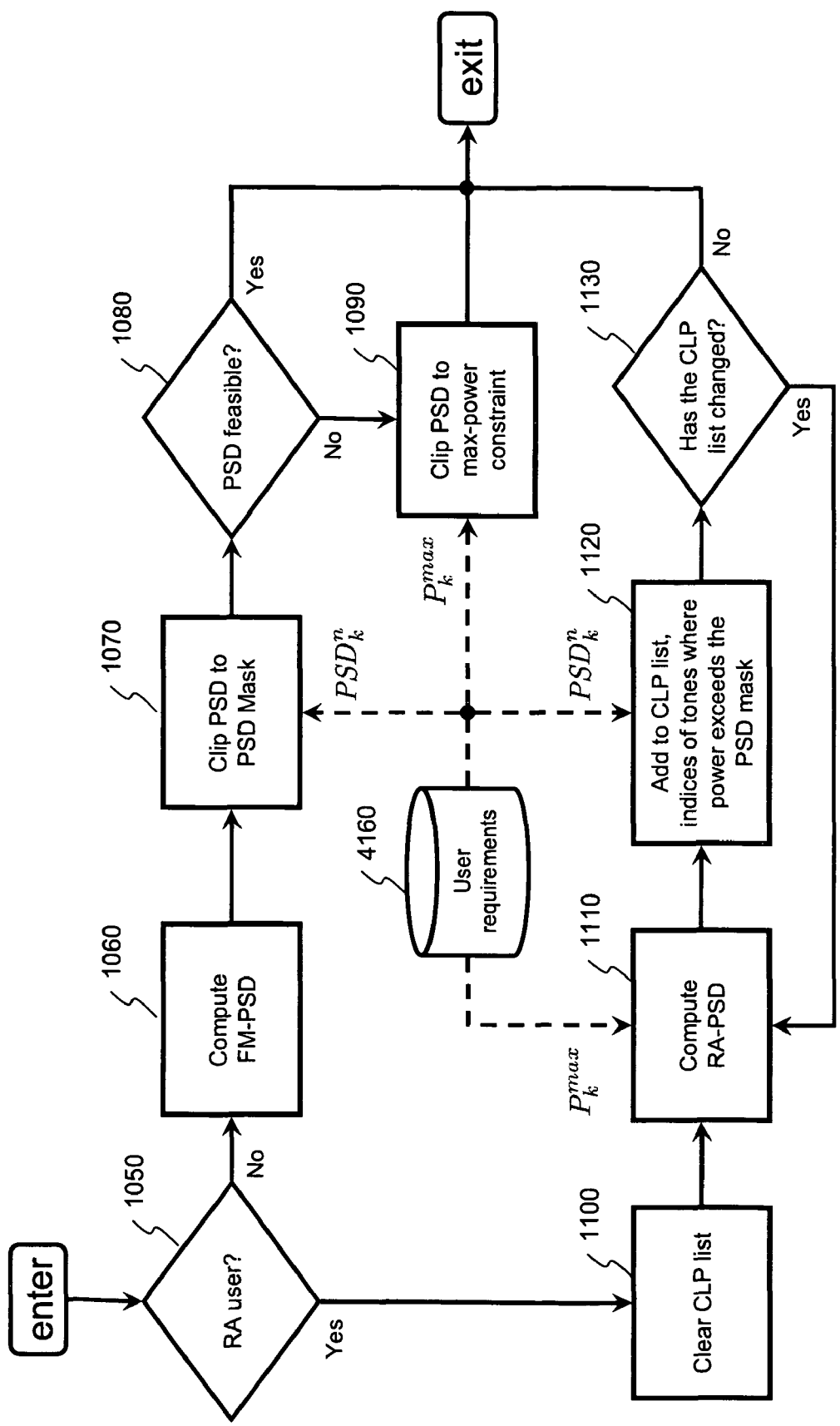
FIG. 10 is a flow diagram illustrating the operation of particularly Block B4 depicted in FIG. 4, according to one embodiment of the invention.

With reference to FIG. 10, the alternative implementation of block B4 440-$k$ (being the "PSD calculation") begins with decision 1050 that determines whether user k is classified as RA or FM. A FM user proceeds to process 1060, where each component of the PSD is calculated by multiplying together the QoS parameter with the noise weight on each tone as given by the equation $$P_k^n = \delta_k \alpha_k^n. \qquad \text{Eq. (41)}$$

Process 1070 then clips any component of the PSD to the maximum level as specified by the PSD mask. Both of these processes are guided by equation (32) in the Theory of Operation, where the max-power penalty fixed to the value $\lambda_k=0$.

Decision 1080 checks the resulting PSD, to ensure that the total sum of the per-tone transmit powers that comprise the PSD does not exceed the maximum power available, as specified by $P_k^{max}$. An updated PSD that exceeds this maximum power value (decision 1080 is NO), is normalized by process 1090 so that its sum is equal to the maximum (for example, as described by equations (36) and (37) in the Theory of Operation), otherwise the implementation of the block is completed.

Alternatively, RA users proceed to process 1100 from decision 1050, where a list, denoted by CLP, is initialized to empty. This list comprises tone indices of PSD components that must be clipped to their maximum level as specified by the PSD mask. A preferred implementation of the CLP list comprises a memory store having size N bits; a binary 1 is stored in the n-th element of the memory store to indicate that the n-th DMT tone is a member of the list; otherwise a binary 0 is stored. The CLP list is constructed by the iterative process next described, starting from an empty list (in the preferred implementation, corresponding to all N bits in a binary 0 state.) Process 1110 computes an updated PSD according to equation (35) given in the Theory of Operation, repeated below $$P_k^n = \begin{cases} PSD_k^n, & n \in CLP_k \\ \left(P_k^{max} - \sum_{m \in CLP_k} PSD_k^m\right) \frac{\alpha_k^n}{\sum_{m \notin CLP_k} \alpha_k^m}, & \text{otherwise.} \end{cases} \qquad \text{[repeated] Eq. (42)}$$

This update comprises two phases. In the first phase, components of the PSD corresponding to those indices found in the CLP list are set equal to the respective PSD mask value. The second phase allocates power to all other components from the power budget that remains after the first phase: power is now distributed according to the fraction of the noise weight associated with a particular tone, over the sum of all noise weights associated with all tones not recorded in the CLP list. Control is then passed to process 1120, where all components of the updated PSD are compared against the PSD mask, obtained from the user requirements database 4160. Any components of the PSD that exceed the corresponding PSD mask value have their tone index added to the CLP list. Decision 1130 is then considered, where the CLP list is inspected to check for any new additions made in process 1120. In a preferred implementation, such changes are determined through a single bit "modification flag" associated with the CLP list, which is set to a binary 1 whenever an addition is made in process 1120, and is cleared (initialized) on entry to the same process 1120. The above procedure is repeated from process 1110 (decision 1130 YES) until the CLP list remains unchanged (decision 1130 NO), and the implementation of the block is completed.

The embodiments above comprise methods that are distributed in nature. Yet another embodiment of the present invention is characterized by a centralized method, where all decisions are made by a centralized entity such as a SMC and where appropriate directives of operational parameters are communicated to relevant DSL modems at appropriate intervals. With reference to FIG. 4, this new embodiment moves the functionality of blocks B2 420-k and blocks B4 440-k into the SMC, alongside block B6 4130, where their respective implementation otherwise remains the same.

With reference to the exemplary network of FIG. 5, communication from CPE 190 of measured loop characteristics may be sent to the SMC 110 through the attached RT 170 or CO 140, and via the access network 1010. It is contemplated that in some situations, the SMC 110 may already have access to such characteristics. For example, from operational data provided by a NMC (not shown in FIG. 5), or by derivation of these characteristics (e.g., combining knowledge of the network loop characteristics and having knowledge of each user's PSD). In these situations, it is contemplated that the explicit communication from CPE 190 to the SMC 110 of measured loop characteristics may be avoided.

The present embodiment otherwise operates in a similar fashion to the preferred embodiment, where the SMC 110 (now comprising the implementation of blocks B2 420-k, B4 440-k and B6 4130) determines an operating PSD for all users through an iterative process as previously described. It is contemplated that each iterate can be effected without newly measured loop characteristics from each CPE 190, as these may be instead derived as indicated above, through knowledge of the network loop characteristics. At convergence of the iterative process, the operational PSD for each user is sent from the SMC 110 to the LT-end modems associated with each user, where blocks B3 430-k determine an appropriate bit-loading for use with the transmitter blocks B5 450-k. It is contemplated that this communication of the operational PSD may take the form of a trivial PSD mask, as defined in paragraph of the Theory of Operation.

One further embodiment can be outlined that is a standard transition to an upstream or bidirectional system in which the person skilled in the art would understand the obvious rearrangement of the described blocks of the downstream system shown and for brevity is not fully detailed.

The detailed description of the invention hereinabove has been described with reference to one or more embodiments of the invention, but is not limited to such embodiments. The description is intended only to be illustrative. Those skilled in the art will readily appreciate that the detailed description given herein with respect to the Figures is provided for explanatory purposes as the invention extends beyond these illustrative embodiments. While embodiments of the present invention are described in relation to DSL, the principles, modifications of, and alternatives to these embodiments, such as modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

The invention claimed is:

1. A method for distributed spectrum management of a digital communication system having a plurality of communication lines on which signals are transmitted and received by respective users, the method comprising the steps of:
  a. collecting information about line, signal and interference characteristics of a specific plurality of the communication lines from a plurality of sources;
  b. determining the line, signal and interference characteristics of said specific plurality of the communication lines; and
  c. varying power allocation of said specific plurality of the communication lines between respective transmitters and receivers using (i) the determined line, signal and interference characteristics of said specific plurality of the communication lines and (ii) respective noise weights of said specific plurality of the communication lines.

2. The method of claim 1, comprising providing required effective data-rates for each fixed margin user, wherein the required effective data-rates allow target data-rates for each of said respective users to be satisfied with minimum power.

3. The method of claim 1, comprising maximizing data-rates with minimum power rate adaptive users to be satisfied with minimum power.

4. The method of claim 1 wherein the digital communication system is a DSL system.

5. The method of claim 1 wherein the step of determining the line, signal and interference characteristics of said specific plurality of the communication lines includes creating a model of the communication lines and determining crosstalk gains of said specific plurality of the communication lines from said model.

6. The method of claim 1 wherein the step of collecting information about line, signal and interference characteristics of the communication lines from a plurality of sources is coordinated by a spectrum management centre.

7. The method of claim 1 wherein the step of collecting information about line, signal and interference characteristics of the communication lines from a plurality of sources includes determining a plurality of signal to interference ratio (SIR) of said communication lines and collating noise weight $$\alpha_k^n = \frac{SIR_k^n}{1 + SIR_k^n}$$

for user k on tone n, where $\alpha_k^n$=noise weight.

8. The method of claim 7 wherein the step of collecting information about line, signal and interference characteristics of the communication lines from a plurality of sources includes combining consideration of respective user requirements to calculate and provide a weighted noise for each line to be used in the step of varying power allocation of particular communication lines between respective transmitter and receiver.

9. The method of claim 8 wherein the step of collecting information about line, signal and interference characteristics of the communication lines from a plurality of sources includes determining a QoS parameter combining collected line measurements and respective user requirements.

10. The method of claim 9 wherein the step of collecting information about line, signal and interference characteristics of the communication lines from a plurality of sources includes determining the QoS parameter $\delta_k$ by $$\delta_k = \exp\left\{\frac{R_k^{target} - \left[\sum_{n=1}^{N} \log(1 + SIR_k^n) - \alpha_k^n \log(\delta_k)\right]}{\sum_{n=1}^{N} \alpha_k^n}\right\}.$$

11. The method of claim 8 wherein the step of collecting information about line, signal and interference characteristics of the communication lines from a plurality of sources includes determining a QoS parameter $\delta_k = \omega_k$, wherein there is a maximization of users data rate according to their respective weighting.

12. The method of claim 1 wherein the step of varying power allocation of particular communication lines between respective transmitter and receiver uses a combined noise determined from two or more of: said noise weights; crosstalk line characteristics; signal and interference characteristics; and a parameter over a particular communication line.

13. The method of claim 12 wherein the step of aggregating noise weights and crosstalk line characteristics over said specific plurality of communication lines to form a combined noise is undertaken at a SMC.

14. The method of claim 12 wherein the step of varying power allocation of particular communication lines between respective transmitter and receiver involves determining a maximum power penalty for each user taking other users into account and altering the power allocation of particular communication lines to a level within a power budget.

15. The method of claim 14 wherein the step of determining a maximum power penalty for each communication line is undertaken locally by each user using only local information including a received combined noise.

16. The method of claim 14 wherein the step of varying power allocation of particular communication lines between respective transmitter and receiver involves determining a target rate penalty for each user and altering the power allocation of particular communication lines according to said respective target rate penalty to thereby meet the required target data rate.

17. The method of claim 16 wherein the step of determining a target rate penalty for each communication line is undertaken locally by each user using only local information.

18. The method of claim 16 wherein the step of varying power allocation of particular communication lines between respective transmitter and receiver involves obtaining a target rate penalty by convergence of two determinations for each user.

19. The method of claim 18 using bisection calculation.

20. The method of claim 18 using (sub)gradient-based update calculation.

21. The method of claim 18 using ellipsoid method calculation.

22. The method of claim 12 wherein the step of varying power allocation of particular communication lines between respective transmitter and receiver uses the calculation of combined noise, performed on a tone-by-tone basis, according to the following formula $$M_k^n = I_k^n + \sum_{\substack{j=1 \\ j \neq k}}^{K} G_{jk}^n \mathcal{N}_j^n,$$ where the value of $I_k$ is given by $$I_k = \begin{cases} 1, & \text{user } k \text{ is a } FM \text{ user, and there are no } RA \text{ users in the same binder} \\ 0, & \text{otherwise} \end{cases}$$

on the collected information about line, signal and interference characteristics of the communication lines from a plurality of sources.

23. The method of claim 1 wherein the step of collecting information about line, signal and interference characteristics of the communication lines from a plurality of sources comprises using network loop characteristics.

24. The method of claim 1 wherein the interference affecting transmission of signals includes crosstalk from communication lines in one or more of the categories of NEXT and FEXT interference.

25. The method of claim 1 wherein the step of varying the power is modified by a preselected weighting system in said communication lines or modified by a preselected target data rate according to selected QoS for each communication line.

26. The method of claim 1 wherein the step of collecting information about line, signal and interference characteristics of the communication lines is performed by a plurality of transmitters and receivers of networked communication lines of a plurality users.

27. The method of claim 1 wherein each user is permitted to transmit and receive signals within an allowable power range and wherein the step of varying power allocation of particular plurality of the communication lines between respective transmitter and receiver uses a model to determine respective power allocation of each communication line based on determined line characteristics, noise weights, and selected QoS for each communication line.

28. The method of claim 27 wherein the step of varying power allocation of each line determines acceptable minimal power allocation for each line.

29. The method of claim 14 wherein the step of varying power allocation of particular plurality of the communication lines between respective transmitter and receiver the power of signals is adjusted for each tone based on the requirements of the localized SIR and on the effect of power allocation on other users by determining allocated power as $$P_k^n = \min\left\{PSD_k^n, \frac{\delta_k \alpha_k^n}{\lambda_k + M_k^n}\right\},$$

for each tone n and where each $M_k^n$ is a combined noise.

30. The method of claim 12, comprising obtaining comprising obtaining crosstalk gains $G_{jk}^n$ of said crosstalk line characteristics from a measurement process.

31. The method of claim 12, comprising obtaining crosstalk gains $G_{jk}^n$ of said crosstalk line characteristics using crosstalk models and loop topology information.

32. The method of claim 12 wherein the determination of power allocation of particular plurality of the communication lines occurs at the SMC.

33. The method of claim 32 wherein the power allocation determination is translated into one or more spectral masks that are consequently sent to a particular plurality of the communication lines and where the step of varying power allocation of said communication lines is then locally determined, where the power is locally controlled by the particular plurality of the communication lines to be the required level if less than the level indicated by the said spectral mask or is the allocated maximum power level indicated by the said spectral mask.

34. A digital communication system having distributed spectrum management of a plurality of communication lines extending between respective receivers and transmitters, the system comprising:

a. a noise weight calculator for determining a weighted noise of each of a plurality of communication lines;

b. a weighted noise aggregator for aggregating the weighted noises of each of the respective plurality of communication lines and outputting combined noise for each communication lines;

c. a power allocation determinator for determining allocated power of a communication line based on the combined noises of the plurality of communication lines of the digital communication systems; and d. bit loading mapper for determining appropriate bit-loading for use in transmission on the communication lines.

35. A digital communication system according to claim 34 wherein each communication line has power allocation determinator for receiving said combined noise and able to locally determine allocated power of its respective communication line based on the determined power needs of the plurality of communication lines of the digital communication systems.

36. A digital communication system according to claim 35 wherein the weighted noise aggregator is located at a SMC.

37. The method of claim 1, including minimizing power on said specific plurality of the communication lines and providing required effective data-rates for each of said respective users.

38. A method for distributed spectrum management of digital communication systems having a plurality of communication lines on which signals are transmitted and received by respective users, the method comprising the steps of:

a. collecting information about line, signal and interference characteristics of a specific plurality of the communication lines from a plurality of sources;

b. determining the line, signal and interference characteristics of said specific plurality of the communication lines; and c. varying power allocation of said specific plurality of the communication lines between respective transmitters and receivers using (i) the determined line, signal and interference characteristics of said specific plurality of the communication lines and; (ii) respective noise weights of said specific plurality of the communication lines to enable a minimum power on a plurality of the communication lines and to allow required effective data-rates for each of said respective users to be satisfied;

wherein said collecting of information about line, signal and interference characteristics of the communication lines from a plurality of sources includes determining a plurality of signal to interference ratio (SIR) of said communication lines and collating noise weight $$\alpha_k^n = \frac{SIR_k^n}{1 + SIR_k^n}$$

for user k on tone n, where $\alpha_k^n$=noise weight or approximation constant.

39. The method of claim 38 wherein said collecting of information about line, signal and interference characteristics of the communication lines from a plurality of sources includes combining consideration of respective user requirements to calculate and provide a weighted noise for each line to be used in the step of varying power allocation of particular communication lines between respective transmitter and receiver.

40. The method of claim 39 wherein said collecting of information about line, signal and interference characteristics of the communication lines from a plurality of sources includes determining a QoS parameter combining collected line measurements and respective user requirements.

41. The method of claim 40 wherein said collecting of information about line, signal and interference characteristics of the communication lines from a plurality of sources includes determining the QoS parameter $\delta_k$ by $$\delta_k = \exp\left\{ \frac{R_k^{target} - \left[\sum_{n=1}^{N} \log(1 + SIR_k^n) - \alpha_k^n \log(\delta_k)\right]}{\sum_{n=1}^{N} \alpha_k^n} \right\}.$$

42. The method of claim 39 wherein said collecting of information about line, signal and interference characteristics of the communication lines from a plurality of sources includes determining a QoS parameter $\delta_k = \omega_k$, wherein there is a maximization of users data rate according to their respective weighting.

43. A method for distributed spectrum management of digital communication systems having a plurality of communication lines on which signals are transmitted and received by respective users, the method comprising the steps of:

a. collecting information about line, signal and interference characteristics of a specific plurality of the communication lines from a plurality of sources;

b. determining the line, signal and interference characteristics of said specific plurality of the communication lines;

c. varying power allocation of said specific plurality of the communication lines between respective transmitters and receivers using (i) the determined line, signal and interference characteristics of said specific plurality of the communication lines, (ii) respective noise weights of said specific plurality of the communication lines, and (iii) a combined noise determined from an aggregate of said noise weights and crosstalk line characteristics over said specific plurality of the communication lines; and d. determining crosstalk gains of said crosstalk line characteristics from a measurement process.

44. The method of claim 43, including minimizing power on said specific plurality of the communication lines and providing required effective data-rates for each of said respective users.

45. A method for distributed spectrum management of digital communication systems having a plurality of communication lines on which signals are transmitted and received by respective users, the method comprising the steps of:

a. collecting information about line, signal and interference characteristics of a specific plurality of the communication lines from a plurality of sources;

b. determining the line, signal and interference characteristics of said specific plurality of the communication lines;

c. varying power allocation of said specific plurality of the communication lines between respective transmitters and receivers using (i) the determined line, signal and interference characteristics of said specific plurality of the communication lines, (ii) respective noise weights of said specific plurality of the communication lines, and (iii) a combined noise determined from an aggregate of said noise weights and crosstalk line characteristics over said specific plurality of the communication lines; and d. obtaining crosstalk gains of said crosstalk line characteristics using crosstalk models and loop topology information.

46. The method of claim 45, including minimizing power on said specific plurality of the communication lines and providing required effective data-rates for each of said respective users.

47. The method of claim 14 wherein the step of varying power allocation of particular communication lines between respective transmitter and receiver involves obtaining an optimum maximum power penalty by convergence of two determinations for each user.

* * * * *

UNITED STATES PATENT AND TRADEMARK OFFICE
CERTIFICATE OF CORRECTION

| | | |
|---|---|---|
| PATENT NO. | : 7,813,293 B2 | Page 1 of 1 |
| APPLICATION NO. | : 11/433025 | |
| DATED | : October 12, 2010 | |
| INVENTOR(S) | : Papandriopoulos et al. | |

It is certified that error appears in the above-identified patent and that said Letters Patent is hereby corrected as shown below:

In Column 11, Line 45, delete "D*" and insert -- P* --, therefor.

In Column 19, Line 31, in Equation (20), delete "RA=0" and insert -- RA=θ --, therefor.

In Column 20, Line 17, in Equation (23), delete "RA=0", and insert -- RA=θ --, therefor.

In Column 22, Line 58, delete " $M_{k\delta FM}^{n}$ ", and insert -- $\mathcal{M}_{k \in FM}^{n}$ --, therefor.

Signed and Sealed this
Twenty-seventh Day of September, 2011

David J. Kappos
*Director of the United States Patent and Trademark Office*